United States Patent

Sugahara et al.

[11] Patent Number: 6,042,765
[45] Date of Patent: Mar. 28, 2000

[54] METHOD FOR PRODUCING A FIBER-REINFORCED THERMOPLASTIC RESIN FOAMED PRODUCT

[75] Inventors: Hiroshi Sugahara, Takatsuki; Koji Yamaguchi, Kyoto; Yoshitaka Nakatani, Kyoto; Koichi Hirao, Kyoto, all of Japan

[73] Assignee: Sekisui Kagaku Kogyo Kabushiki Kaisha, Osaka, Japan

[21] Appl. No.: 08/762,056

[22] Filed: Dec. 9, 1996

Related U.S. Application Data

[63] Continuation of application No. 08/336,657, Nov. 4, 1994, abandoned.

[30] Foreign Application Priority Data

Nov. 10, 1993 [JP] Japan ..................... 5-281116

[51] Int. Cl.⁷ .................................................. B29C 44/24
[52] U.S. Cl. ................. 264/46.1; 264/46.6; 264/46.8; 264/46.9; 264/54; 264/257; 264/514; 264/571; 264/572
[58] Field of Search .................. 264/45.8, 45.9, 264/46.1, 46.2, 46.3, 46.4, 46.6, 46.8, 46.9, 54, 257, 258, 511, 516, 571, 572, 573, 512, 514; 156/79

[56] References Cited

U.S. PATENT DOCUMENTS

| | | | |
|---|---|---|---|
| 3,399,094 | 8/1968 | Skoggard et al. | 156/79 |
| 3,655,470 | 4/1972 | Takeshima et al. | 264/54 |
| 4,025,375 | 5/1977 | Leasure | 156/79 |
| 4,097,319 | 6/1978 | Shimokawa et al. | 264/54 |
| 4,240,850 | 12/1980 | Arntz | 264/45.8 |
| 4,940,629 | 7/1990 | Weber et al. | 264/45.5 |
| 5,374,383 | 12/1994 | Brambach | 264/46.5 |

FOREIGN PATENT DOCUMENTS

| | | |
|---|---|---|
| 2 432 670 | 2/1980 | France . |
| 1 704 877 | 7/1971 | Germany . |
| 1704877 | 7/1971 | Germany . |
| 26 45 173 | 4/1978 | Germany . |

OTHER PUBLICATIONS

Patent Abstracts of Japan, vol. 017 No. 191(M–1396) Apr. 14, 1993.

*Primary Examiner*—Jan H. Silbaugh
*Assistant Examiner*—Kenneth M. Jones
*Attorney, Agent, or Firm*—Kanesaka & Takeuchi

[57] ABSTRACT

A method of the invention can produce a fiber-reinforced thermoplastic resin foamed product having less unevenness in a thickness of a surface layer and excellent mechanical strength. In the method, a fiber-reinforced thermoplastic resin sheet is continuously shaped into a hollow member, and a foaming resin composition containing a thermoplastic resin and a foaming agent is supplied into an interior of the obtained hollow member. The foaming agent is foamed so that the hollow member is shaped into a desired form by the foaming pressure.

18 Claims, 17 Drawing Sheets

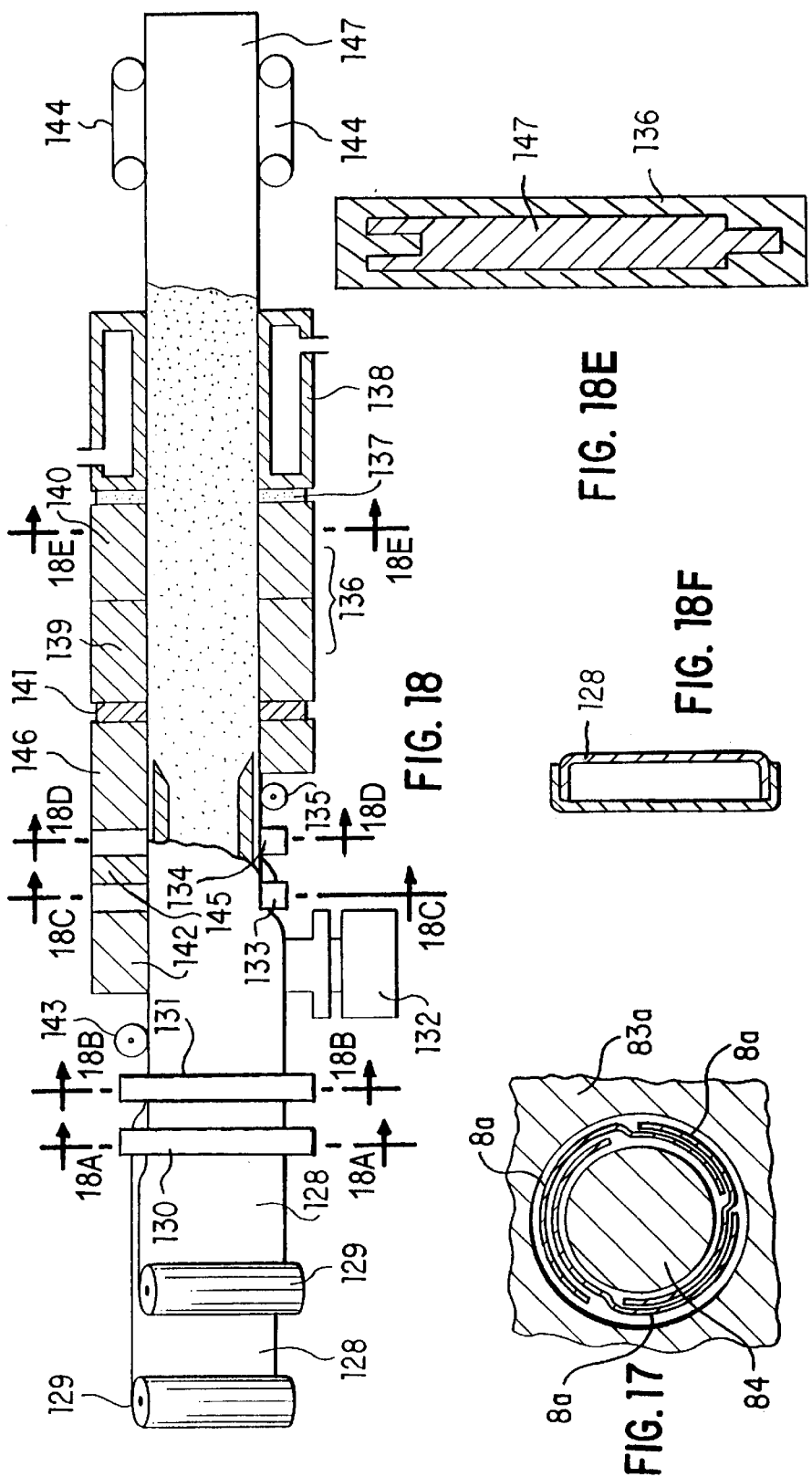

METHOD FOR PRODUCING A FIBER-REINFORCED THERMOPLASTIC RESIN FOAMED PRODUCT

CROSS REFERENCE TO RELATED APPLICATION

This is a continuation application of Ser. No. 08/336,657 filed on Nov. 4, 1994, now abandoned.

BACKGROUND OF THE INVENTION AND RELATED ART STATEMENT

The present invention relates to a method for producing a fiber-reinforced thermoplastic resin foamed product including a core layer formed of a thermoplastic resin foamed member, and a surface layer formed of a fiber-reinforced thermoplastic resin sheet.

Elongated products having different shapes in a lateral section and having a foamed layer therein have been used as a constructing material and the like in the same manner as a natural wood material, or as a substitute. For such use, in order to increase the rigidity of the material, a formed product including a core layer formed of a thermoplastic resin foamed member and a surface layer formed of a fiber-reinforced thermosetting plastic resin composite has been used.

Japanese Patent Publication (KOKAI) No. 4-339635 discloses a method, wherein in order to continuously produce a composite having a good mechanical strength with light weight, while continuously supplying a synthetic resin foamed member in one direction, continuous fibers permeated with a thermosetting plastic resin are applied onto an outer surface of the synthetic resin foamed member, which are heated and drawn out to obtain a foamed product.

However, in the method, it is necessary to prepare, beforehand, the foamed member with irregular shape in the lateral cross section. Further, since the foamed product is produced by a draw molding, a resin having a low viscosity is used, so that the thickness of the surface layer and mechanical strength of the foamed product tend to be ununiform. Also, it is difficult to modify and shape the product in a mold.

In view of the above problems, in producing a fiber-reinforced thermoplastic resin foam ed product comprising a surface layer of a fiber-reinforced thermoplastic resin and a core layer of a foamed member, it is an object of the present invention to provide a method for producing a fiber-reinforced thermoplastic resin foamed product having less unevenness in the thickness of the surface layer and an excellent mechanical strength, such as a bending strength.

SUMMARY OF THE INVENTION

In a method of the invention, a fiber-reinforced thermoplastic resin foamed product is formed. The method comprises shaping at least one fiber-reinforced sheet continuously to form a hollow member, supplying a foamable resin composition containing a thermoplastic resin and a foaming agent to the inside of the hollow member, and foaming the foamable resin composition to shape the hollow member in a desired form by a foaming pressure.

The fiber-reinforced sheet nay be a fiber-reinforced thermoplastic resin sheet or fibrous sheet, or contain continuous fibers arranged in a longitudinal direction of the hollow member. Also, the foamable resin composition may be supplied to the inside of the hollow member while the foamable resin composition is foaming, or after the foamable resin composition is supplied to the inside of the hollow member, the foamable resin composition may be foamed. Further, the hollow member may be shaped by a vacuum forming and/or an air pressure forming to a predetermined shape in a cross section.

In one embodiment, the fiber-reinforced thermoplastic resin sheet contains continuous fibers arranged in the longitudinal direction of the hollow member. In this case, the hollow member is supplied in a mold, and the foamable resin composition is supplied to the inside of the hollow member while the foaming agent is foaming. Then, the hollow member is drawn from the mold while the foamable resin composition is forming to thereby shape the hollow member.

In the invention, an expansion ratio of the foamable resin composition is in a range of 1.5 to 5 times relative to a volume of the foamable resin composition before foaming.

In another embodiment of the invention, a fiber-reinforced thermoplastic resin foamed product is formed by preparing at least one composite sheet formed of a fiber-reinforced thermoplastic resin layer and a foamable resin composition layer containing a thermoplastic resin and a foaming agent, shaping the at least one composite sheet continuously to form a hollow member so that the fiber-reinforced thermoplastic resin layer forms an outer layer, and foaming the foamable resin composition to shape the hollow member in a desired form by a foaming pressure. The hollow member may be shaped by a vacuum forming or an air pressure forming to a predetermined shape in a cross section.

In a further embodiment of the invention, a fiber-reinforced thermoplastic resin foamed product is formed by shaping at least one fiber-reinforced thermoplastic resin sheet continuously to form a hollow member, supplying a composite foamable sheet to an inside of the hollow member and integrally uniting the composite foamable sheet and the hollow member together, shaping the hollow member, and heating the same. The composite foamable sheet contains a fibrous sheet in a form of a mat, and a foamable resin composition permeated into the fibrous sheet and having a thermoplastic resin and a decomposition foaming agent. The hollow member may be shaped by a vacuum forming and/or an air pressure forming, and the foamable resin composition is heated at a temperature higher than a foaming temperature of the foaming agent to thereby enlarge and thicken the hollow member.

BRIEF DESCRIPTION OF THE DRAWINGS

FIG. 4-1 is a sectional view of a shaping mold taken along a line (4-1)—(4-1) in FIG. 4;

FIG. 5-1 is a sectional view of a heating mold taken along a line (5-1)—(5-1) in FIG. 5;

FIG. 5-2 is a sectional view of the heating mold taken along a line (5-2)—(5-2) in FIG. 5;

FIG. 5-3 is a sectional view of a hollow member obtained by shaping a composite sheet into an ellipse at an entrance of the heating mold;

FIG. 17 is a partial cross section view of a shaping mold of an apparatus for producing a fiber-reinforced thermoplastic resin sheet used in Example 20;

FIG. 18 is a sectional diagram of an apparatus for producing a fiber-reinforced thermoplastic resin foamed product used in Example 10;

FIG. 18-1 is a section view of a state where a fiber-reinforced thermoplastic resin sheet has been inserted into a slit member 130, taken along a line (18-1)—(18-1) in FIG. 18;

FIG. 18-2 is a section view of a state where a fiber-reinforced thermoplastic resin sheet has been inserted into a slit member 131, taken along a line (18-2)—(18-2) in FIG. 18;

FIG. 18-3 is a section view of a state where a fiber-reinforced thermoplastic resin sheet has been inserted into a slit member 133, taken along a line (18-3)—(18-3) in FIG. 18;

FIG. 18-4 is a section view of a state where a fiber-reinforced thermoplastic resin sheet has been inserted into a slit member 134, taken along a line (18-4)—(18-4) in FIG. 18;

FIG. 18-5 is a section view of an outlet portion of a heating mold 140 taken along a line (18-5)—(18-5) in FIG. 18;

FIG. 18-6 is a view for showing a sectional shape of a hollow member at an inlet port of a heating mold;

DETAILED DESCRIPTION OF PREFERRED EMBODIMENTS

Figure 1:
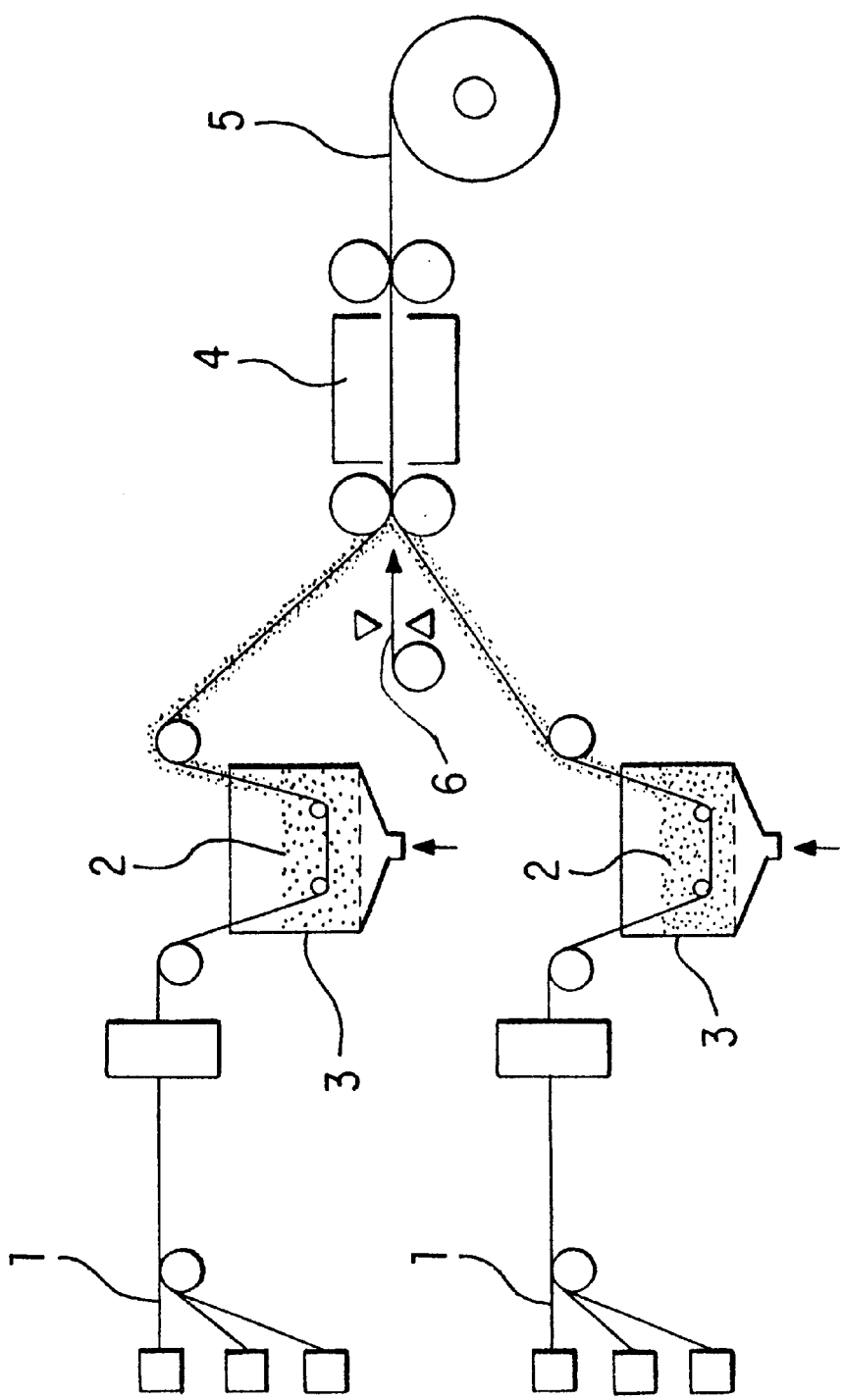
FIG. 1 is a diagram of an apparatus for producing a fiber-reinforced thermoplastic resin sheet used in Example 1.

To begin with, first to tenth aspects of the present invention are explained hereunder.

The first aspect of the invention comprises a process for continuously shaping at least one fiber-reinforced thermoplastic resin sheet into a hollow member, and a process for supplying a foamable resin composition, while foaming, into an inner surface of the hollow member so that the hollow member can be shaped into a desired form by a foaming pressure.

The second aspect of the invention comprises a process for continuously shaping at least one fiber-reinforcing thermoplastic resin sheet into a hollow member, and a process for supplying a foamable resin composition to an inner surface of the hollow member and heating the foamable resin composition to a temperature higher than a foaming temperature of a foaming agent, so that the hollow member can be shaped into a desired form by a foaming pressure.

The third aspect of the invention comprises a process for continuously shaping at least one composite sheet comprising a fiber-reinforced thermoplastic resin layer and a foamable resin composition layer into a hollow member so that the fiber-reinforced thermoplastic resin layer becomes an outer layer thereof, and a process for foaming the foamable resin composition layer so that the hollow member can be shaped into a desired form by a foaming pressure.

The fourth aspect of the invention comprises a process for continuously shaping at least one fibrous sheet into a hollow member, and a process for supplying a foamable resin composition, while foaming, to an inner surface of the hollow member so that the hollow member can be shaped into a desired form by a foaming pressure.

The fifth aspect of the invention comprises a process for continuously shaping at least one fibrous sheet into a hollow member, and a process for supplying a foamable resin composition to an inner surface of the hollow member and heating the foamable resin composition to a temperature higher than a foaming temperature of a foaming agent so that the hollow member can be shaped into a desired form by a foaming pressure.

The sixth aspect of the invention comprises a process for continuously shaping at least one fiber-reinforced thermoplastic resin sheet into a hollow member, a process for forming the hollow member into a certain shape in its cross section under a vacuum forming and/or an air pressure forming, and a process for supplying a foamable resin composition comprising a thermoplastic resin and a foaming agent, while foaming, to an inner surface of the hollow member so that the hollow member can be shaped into a desired form by a foaming pressure.

The seventh aspect of the invention comprises a process for continuously shaping at least one fiber-reinforced thermoplastic resin sheet into a hollow member, a process for subjecting the hollow member to a vacuum forming and/or an air pressure forming so that the hollow member is formed into a predetermined shape in its cross section, and a process for supplying a foamable resin composition comprising a thermoplastic resin and a foaming agent to an inner surface of the hollow member formed by the vacuum forming and/or the air pressure forming and heating the foamable resin composition to a temperature higher than a foaming temperature of the foaming agent so that the hollow member can be shaped into a desired form by a foaming pressure.

The eighth aspect of the invention comprises a process for continuously shaping at least one composite sheet comprising a fiber-reinforced thermoplastic resin layer and a foamable resin composition layer into a hollow member so that the fiber-reinforced thermoplastic resin layer becomes an outer layer, a process for subjecting the hollow member to a vacuum forming and/or an air pressure forming so that the hollow member is formed into a predetermined shape in its cross section, and a process for foaming the foamable resin composition layer so that the hollow member can be shaped into a desired form by a foaming pressure.

The ninth aspect of the invention comprises a process for continuously shaping at least one fiber-reinforced thermoplastic resin sheet in which a large number of continuous fibers are oriented, into a hollow member so that the continuous fibers are arranged in a longitudinal direction, a process for supplying the hollow member into a mold, and a process for supplying a foamable resin composition comprising a thermoplastic resin and a foaming agent, while foaming, into an inner surface of the hollow member and drawing out the hollow member so that the hollow member can be shaped into a desired form by a foaming pressure.

The tenth aspect of the invention comprises a process for continuously shaping at least one fiber-reinforced thermoplastic resin sheet in which a large number of continuous fibers are oriented, into a hollow member so that the continuous fibers are arranged in a longitudinal direction, a process for supplying the hollow member into a mold, and a process for supplying a foamable resin composition comprising a thermoplastic resin and a foaming agent into an inner surface of the hollow member, heating the foamable resin composition to a temperature higher than a foaming temperature of the foaming agent and drawing out the hollow member so that the hollow member can be shaped into a desired form by a foaming pressure.

In the present invention, as a thermoplastic resin to be used for the fiber-reinforced thermoplastic resin sheet, though the resin is not specifically limited, for example, polyvinyl chloride, chlorinated polyvinyl chloride, vinyl chloride-vinyl acetate copolymer, vinyl chloride-acrylic acid copolymer, polyethylene, polypropylene, polystyrene, polyamide, polycarbonate, polyphenylene sulfide, polysulfone and polyetheretherketone, polymethyl methacrylate, and in addition, a thermoplastic elastomer and the like are mentioned. Also, the thermoplastic resin for the fiber-reinforced thermoplastic resin sheet includes a copolymer, a modified resin and a blend resin containing the above thermoplastic resin as a main component. For example, an ethylene-vinyl chloride copolymer, a vinyl acetate-vinyl chloride copolymer, silane modified polyethylene, acrylic acid modified polypropylene and so on are mentioned. In a shaping process, the fiber-reinforced thermoplastic resin sheet is sometimes required to be stretched. In such a case, it is preferable to use a thermoplastic resin having a good stretchability, or a cross-linking treatment may be applied properly to the fiber-reinforced thermoplastic resin in order to improve the stretchability thereof. In view of the cost, polyvinyl chloride, polypropylene or polyethylene is preferred.

It is preferable to use a thermoplastic resin having a melt viscosity of $1 \times 10^5 - 10^7$ poise since an unevenness in a thickness of the surface layer hardly occurs.

Incidentally, in the present invention, the "melt viscosity" means an apparent viscosity in a flow tester (Koka type flow tester) when a thermoplastic resin is extruded through a nozzle with a diameter of 1 mm and a length of 10 mm, at a rate of 150 kg/cm$^2$ and at a temperature where thermal fusion is possible.

The thermoplastic resins as mentioned above can be used solely or as a mixture thereof. An additive, a filler, a processing aid and a modifier, such as a heat stabilizer, plasticizer, lubricant, antioxidant, ultraviolet absorber, pigment, inorganic filler and reinforcing short fibers, may be added to the thermoplastic resin.

As fibers to be used for the fiber-reinforced thermoplastic resin sheet, any fibers usable as reinforcing fibers, for example, inorganic fibers, such as glass fibers, carbon fibers and metal fibers; synthetic fibers, such as alamide fibers and vinylon; and natural fibers, such as silk, cotton and linen, can be used.

As the fibers, in order not to damage the surface smoothness of an obtained fiber-reinforced thermoplastic resin sheet while maintaining its impact resistance, it is preferable to use long fibers or continuous fibers with a diameter of 1–100 micro meters and a length of 10 mm or longer. A fiber state in the fiber-reinforced thermoplastic resin sheet is not limited to a specific form. For example, a mat form where long fibers are oriented at random; a roving form, strand form and cloth form comprising continuous fibers; a form where respective continuous fiber filaments are arranged in a longitudinal direction of a composite and branched in an open state; or a combination of a plurality of the fibers in the above-mentioned forms, can be mentioned.

The fiber-reinforced thermoplastic resin sheet to be used in the present invention can be produced, for example, as follows, though its production is not limited to a certain method.

In case a fiber-reinforced thermoplastic resin sheet having a state where fibers are arranged in one direction is produced, a thermoplastic resin in a powder form is supplied into a fluidizing tank, and air is ejected thereinto through a perforated plate provided at a bottom of the tank to thereby fluidize the thermoplastic resin. A plurality of fiber bundles guided by guide rollers is passed through the fluidizing resin to obtain thermoplastic resin adhered fiber bundles, and the thus obtained fiber bundles are passed through heating rollers so that the thermoplastic resin is permeated into and adhered to the fibers. Finally, the fibers with the thermoplastic resin are passed through cooling rollers to obtain a desired fiber-reinforced thermoplastic resin sheet.

Also, in case a fiber-reinforced thermoplastic resin sheet where fibers are oriented at random is produced, the fiber bundles with the thermoplastic resin obtained as explained above are cut into pieces by a rotary cutter to fall onto a lower endless belt and collected. The pieces are passed through a heating furnace while being pressed between endless belts so that the cut fibers are permeated with the thermoplastic resin, and then passed through cooling guide rollers to obtain a desired fiber-reinforced thermoplastic resin sheet.

Also, in case a thermoplastic resin having a low melt viscosity is used, the thermoplastic resin in a molten state is soaked into the fibers to thereby obtain a thermoplastic resin sheet. In such a case, it is preferable to cross-link the thermoplastic resin after a fiber-reinforced thermoplastic resin sheet is produced.

In case a hollow member is shaped into a predetermined form by a vacuum forming or an air pressure forming, in order to improve airtightness and shaping ability of the hollow member, in the manufacturing method as mentioned above, it is preferable that the fiber bundles are permeated with the thermoplastic resin beforehand, or a surface treatment is made to the obtained fiber-reinforced thermoplastic resin sheet, so that the contact of the fibers and the thermoplastic resin is improved.

Incidentally, the fiber-reinforced thermoplastic resin sheet may be a single layer, or a laminate structure formed of a plurality of the fiber-reinforced thermoplastic resin sheets.

Although the thickness of the fiber-reinforced thermoplastic resin sheet is not limited, when the fiber-reinforced thermoplastic resin sheet is thin, the reinforcing effect can not be obtained, and when it is thick, it is difficult to shape the sheet into the hollow member. Therefore, the thickness in a range from 0.1 to 10 mm is preferable. When an amount of the fibers contained in the fiber-reinforced thermoplastic resin sheet is small, the sufficient reinforcing effect and forming stability can not be obtained, and if the amount is large, the fibers can not be permeated with the thermoplastic resin so that fuse bonding becomes difficult, and the reinforcing effect is decreased. In addition, in case the hollow member is subjected to the vacuum forming and/or the air pressure forming, when the airtightness is decreased, the hollow member can not be shaped sufficiently. Therefore, it is preferable that the amount of the fibers contained in the fiber-reinforced thermoplastic resin sheet is in a range from 5 to 70 volume %, more preferably from 10 to 50 volume %.

The fiber-reinforced thermoplastic resin sheet is formed into a hollow member, and the hollow member is shaped by a vacuum forming, an air pressure forming or a foaming pressure. In that case, the hollow member may be regulated by a regulating member, such as a mold, from the outside, so that friction force is generated between the regulating member and the fiber-reinforced thermoplastic resin sheet.

Therefore, when a draw forming is carried out against the friction force, in order to prevent the fiber-reinforced thermoplastic resin sheet from being cut off, it is preferable to use a fiber-reinforced thermoplastic resin sheet where the continuous fibers are arranged in a longitudinal direction thereof. Incidentally, when a plurality of the fiber-reinforced thermoplastic resin sheets is laminated, it is sufficient that one of the sheets has the fiber-state as mentioned above.

When a composite sheet comprising a foamable resin composition layer laminated on one surface of the fiber-reinforced thermoplastic resin layer comprising the above mentioned fiber-reinforced thermoplastic resin sheet is used as a substitute for the fiber-reinforced thermoplastic resin sheet, gas generated from the foamable resin composition is prevented from penetrating into an interface between the surface layer and the core layer of the obtained fiber-reinforced thermoplastic resin foamed product. Thus, it is possible to prevent voids from forming between the surface layer and the core layer of the obtained fiber-reinforced thermoplastic resin foamed product, and to obtain the fiber-reinforced thermoplastic resin foamed product excellent in the fuse-bonding between the surface layer and the core layer.

The foamable resin composition layer comprises the same substance as a foamable resin composition which is supplied to the inner surface of the hollow member in an unfoamed state, as described hereunder.

As in the fiber-reinforced thermoplastic resin sheet, the composite sheet may be used singly or in a laminate structure formed of a plurality of the composite sheets.

The method for producing the composite sheet is not limited to a specific way. For example, there are methods, wherein a foamable resin composition sheet prepared beforehand is heated and fuse-bonded on one surface of the fiber-reinforced thermoplastic resin sheet obtained as described above to thereby obtain a composite sheet; and wherein a foamable resin composition in an unfoamed condition is extruded in a sheet form onto one surface of the fiber-reinforced thermoplastic resin sheet obtained as described above to thereby obtain a composite sheet.

A fibrous sheet may be substituted for the fiber-reinforced thermoplastic resin sheet. In case the fibrous sheet is used, when the hollow member is shaped by a foaming pressure of the foamable resin composition, the fibrous sheet can be permeated with the foamable resin composition, so that the fiber-reinforced thermoplastic resin sheet need not be prepared beforehand thus to eliminate the process.

As the fibers to be used for the fibrous sheet, any fibers can be used if the fibers do not melt at a melting temperature of the thermoplastic resin for constituting the foamable resin composition or at a foaming temperature of the foamable resin composition, and are not limited to a specific fiber. For example, a glass fiber, carbon fiber, silicon fiber, titanium fiber, carbon fiber, boron fiber, metal fiber, alamide fiber, polyester fiber, and polyamide fiber are mentioned.

When a diameter of a mono-filament of the fiber to be used for the fibrous sheet is small, a reinforcing effect can not be obtained. If it is large, the number of the fibers per unit area is decreased since a weight per unit area is maintained in a certain value not to impair its light weight. Therefore, a contact area between the resin and the fibers is reduced and strength of a surface layer of the obtained fiber-reinforced thermoplastic resin foamed product is decreased. Thus, the diameter of the mono-filament is, preferably, in a range from 1 to 50 micro meters, and, more preferably, from 3 to 23 micro meters.

The "fibrous sheet" means that the fibers are piled or assembled together into a sheet form, and preferable examples are long fibers or continuous fibers bound with a little amount of if binding agent, such as a continuous mat, swirl matte, chopped strand mat, and fiber cloth and the like.

When a percentage of voids in the fibrous sheet is small, the fibrous sheet is not sufficiently permeated with a resin due to foaming of the foamable resin composition, so that the surface layer thereof tends to be peeled from the core layer. While if the percentage is large, the reinforcing effect by the fibers is decreased. Therefore, the percentage of voids is preferable in a range from 5 to 15 volume %.

Incidentally, when the hollow member is shaped, the hollow member may be stretched as a whole or partially. In such a case, the hollow member may be cracked or is thinned partially, so that the surface layer of the obtained fiber-reinforced thermoplastic resin foamed product tends to have portions where rigidity is partially decreased. In order to prevent the problem, when the above fiber-reinforced thermoplastic resin sheet or the fibrous sheet is used, a highly stretchable thermoplastic resin layer may be laminated onto the outer or inner surface of the hollow member, and in case the composite sheet is used, the stretchable layer may be laminated on the outer surface of the hollow member.

Especially, it is preferable to laminate the thermoplastic resin layer onto the outer surface of the hollow member since the obtained fiber-reinforced thermoplastic resin foamed product is improved in its smoothness of the surface layer in addition to the above-mentioned effects.

Also, in case the hollow member is subjected to a vacuum forming and/or an air pressure forming, airtightness of the hollow member is improved by laminating the thermoplastic resin layer as described above to thereby improve shaping of the hollow member.

A method for shaping the fiber-reinforced thermoplastic resin sheet, the composite sheet and the fibrous sheet into the hollow member, is not specifically limited. For example, in addition to methods using a mold as explained later in embodiments, there is a method where the sheet is gradually bent by using a shoe or rollers made of a synthetic resin or metal. When a sheet is shaped into a hollow form, in order to prevent the fiber-reinforced thermoplastic resin sheet, the composite sheet or the fibrous sheet from being cracked or torn, it is preferable to shape the thermoplastic resin in a soft state, while heating by an infrared ray heater or a hot air blower.

Incidentally, the "hollow member" in the present invention includes a hollow member where both ends have a space therebetween, in addition to a hollow member where both ends abut against each other or are overlapped each other.

In case the hollow member is subjected to an air pressure formation, when a thermoplastic resin having a high melt viscosity is used for the fiber-reinforced thermoplastic resin sheet or the composite sheet, and both ends of the hollow member are joined by melting the thermoplastic resin in a process of shaping into the hollow member, even if both ends of the hollow member abut against each other, there is no problem of lowering a shaping ability in the vacuum forming and/or the air pressure forming. Otherwise, it is preferable to overlap both ends with each other so that the airtightness and shaping ability of the hollow member are improved.

Also, when the fiber-reinforced thermoplastic resin sheet, the composite sheet and the fibrous sheet are shaped into the hollow member, a plurality of the fiber-reinforced thermoplastic resin sheets and the like may be used so that the respective ends of the sheets abut against or overlap with each other to shape the hollow member.

Especially, in case the whole circumference with a desired cross section becomes larger than that of the hollow member when shaped by the vacuum forming and/or the air pressure forming or foaming pressure, the respective ends of the plural fiber-reinforced thermoplastic resin sheets and the like are overlapped by the length to be elongated on the elongated portion in a shaping process to shape the hollow member. As a result, the overlapped portions are moved when elongated, and the respective fiber-reinforced thermoplastic resin sheets are elongated gradually.

Therefore, an elongating degree of the respective fiber-reinforced resin sheets for the hollow member becomes smaller when compared with that of one fiber-reinforced thermoplastic resin sheet for the hollow member.

Therefore, by overlapping the respective both ends of the plural fiber-reinforced thermoplastic resin sheets to shape a hollow member, the surface layer is prevented from being thinned, so that rigidity of the obtained fiber-reinforced thermoplastic resin foamed product is not decreased. At the same time, it is possible to prevent the surface layer from being thinned partially by partial enlargement of the hollow member in the shaping process of the hollow member, and the fiber-reinforced thermoplastic resin foamed product has preferably a uniform rigidity as a whole.

The first, second, fourth, fifth, ninth and tenth aspects of the invention are characterized by shaping the hollow member obtained as described above into a desired form by a foaming pressure; the sixth and seventh aspects of the invention are characterized by shaping the hollow member obtained as described above into a desired form by a vacuum forming and/or air pressure forming and the foaming pressure; the third aspect of the invention is characterized by foaming the foamable resin composition layer of the hollow member obtained as described above, and shaping it into a desired form by the foaming pressure; and the eighth aspect of the invention is characterized by shaping the hollow member obtained as described above into a desired form by the vacuum forming and/or the air pressure forming and the foaming pressure.

It is needless to say that the "air" in the air pressure forming includes a gas, such as nitrogen gas in addition to so called "atmospheric air".

In the sixth to eighth aspects of the invention, in case the hollow member is shaped by the foaming pressure of the foamable resin composition as well as the vacuum forming and/or the air pressure forming, when comparing with a case where the hollow member is shaped by only the foaming pressure, preferably it is possible to obtain a fiber-reinforced thermoplastic resin foamed product having a complicated cross section, especially an accurate cross section.

A foamable resin composition to be used in the invention includes a thermoplastic resin and a foaming agent.

As the thermoplastic resin, there are mentioned any thermoplastic resins which are foamable, for example, polyvinyl chloride, chlorinated polyvinyl chloride, polyethylene, polypropylene, polystyrene, polyamide, polycarbonate, polyphenylene sulfide, polysulfone, polyetheretherketone and the like. However, when compared with the thermoplastic resins to be used for the fiber-reinforced thermoplastic resin sheet, in a formation temperature region, resins having a good fluidity with a relatively lower viscosity can be preferably used to prevent uneven foaming and to improve uniformity of a thickness of the surface layer of the fiber-reinforced thermoplastic resin foamed product.

Incidentally, the thermoplastic resin to be used for the fiber-reinforced thermoplastic resin sheet as a surface layer and the thermoplastic resin to be used for a foamable resin composition need not be the same. Combination of the resins is not specifically limited provided that when both resins are heated to a molten state, i.e. a state where a heat fusion-bonding is possible, and press-contacted, an interface between the fuse-bonded resins is not easily detached after they are cooled down.

However, in case the fibrous sheet is used, when a melt viscosity of the thermoplastic resin to be used as the foamable resin composition is high, it is difficult to permeate the resin between the fibrous sheets, while if it is low, bubbles of the obtained foamed member does not become uniform and fine. Therefore, it is preferable that the melt viscosity of the thermoplastic resin is in a range from 6,000 to 30,000 poise.

Incidentally, the thermoplastic resin to be used for the foamable resin composition may be used singly or as a mixture of a plurality of resins. Further, in a range where the foaming ability of the foamable resin composition is not damaged, additives, fillers, processing aids and modifiers, such as a heat stabilizer, plasticizer, lubricant, antioxidant, ultraviolet absorber, pigment, inorganic filler and reinforcing fibers may be added thereto.

In view of recycling, waste plastic, woody material, wood powder, sheet molding compound crushed powder and the like are preferably used.

In case the reinforcing fibers are added to the resin, when an amount of the fibers is small, a satisfactory reinforcing effect can not be obtained, while if the amount is large, it is difficult to uniformly foam the foamable resin composition to thereby decrease the reinforcing effect, on the contrary. Therefore, the amount of the reinforcing fibers is in a range from 5 to 60 volume %, and, more preferably, from 20 to 30 volume % of the foamable resin composition.

Further, a cross-linking treatment may be applied in order to improve the foaming ability.

The cross-linking treatment is not limited to a specific method. For example, there are cross-linking methods where cross-linking is carried out by irradiating an activation energy ray, such as a visible light, ultraviolet ray, alpha ray, beta ray, gamma ray, X ray or electron beam; where an organic peroxide is added thereto to decompose; where a cross-linking silane modified thermoplastic resin is added thereto and the mass is subjected to a water treatment; and the like.

As a thermoplastic resin to be able to cross-link by an electron beam, for example, a thermoplastic resin having an alpha-hydrogen, such as polyethylene, polypropylene, polystyrene and the like, is mentioned. Also, as a thermoplastic resin to be able to cross-link by the visible light and ultraviolet ray, a thermoplastic resin, if necessary, containing a light polymerization initiator (photosensitizer) is mentioned. As the light polymerization initiator, for example, benzoinalkylether series, acetophenone series, benzophenone series, thioxanthone series and the like, are mentioned.

Also, as the organic peroxide, which is not specifically limited, for example, isobutyl peroxide, dicumyl peroxide, 2,5-dimethyl- 2,5-di(t-butylperoxide)hexene, 1,3-bis(t-butylperoxyisopropyl)benzene, t-butylcumylperoxide, di-t-butylperoxide and the like, are mentioned.

In this case, although the thermoplastic resin itself tends to be, generally, torn by adding the organic peroxide, in case the thermoplastic resin is not cross-linked to a desired extent, a cross-linking agent, such as triallylcyanulate and diallylphthalate, may be suitably added thereto.

The foaming agent, which is not limited to a specific one, includes a gas in addition to a decomposing type foaming agent which decomposes to generate a gas, and a physical-type foaming agent which generates a gas by evaporation. As the decomposing type foaming agent, for example, azodicarbonamide, azobisisobutyronitrile, N,N'-dinitropentamethylenetetramine, p,p'-oxybisbenzenesulfonylhydrazide, azodicarboxylic acid barium, trihydrazinotriazine and 5-phenyltetrazole are mentioned.

As the physical type foaming agent, for example, an aliphatic hydrocarbon, such as isopentane, heptane and cyclohexane; and an aliphatic hydrocarbon fluoride, such as trichlorotrifluoroethane and dichlorotetrafluoroethane are mentioned.

As the gas, for example, air, nitrogen and helium are mentioned.

When a foaming expansion ratio in the obtained foamed member is high, rigidity of the obtained foamed member for constituting the core layer is decreased. Therefore, the foaming agent is preferably mixed to foam in a range of 30 times or less, preferably between 1.5 and 5 times.

Specifically, in case of the decomposing type foaming agent and the physical-type foaming agent, though an amount to be added varies depending on a kind of the foaming agent, it is preferable to add 1 to 20 parts by weight of a foaming agent with respect to 100 parts by weight of a thermoplastic resin.

In the present invention, in case the fiber-reinforced thermoplastic resin or fibrous sheet is used without using a composite sheet, although it is required to supply the foamable resin composition, the foamable resin composition may be supplied into an inner surface of the hollow member while foaming or in an unfoamed state.

As a method of supplying the foamable resin composition while foaming, for example, there are a method wherein after a foamable resin composition is prepared by kneading or permeating a foaming agent into the thermoplastic resin at a temperature lower than a foaming temperature, the thus obtained foamable resin composition is fed into an extruder and heated to a temperature higher than the foaming temperature, which is supplied while foaming; and a method wherein a thermoplastic resin is supplied into an extruder and melt-kneaded therein to obtain a thermoplastic resin in a molten state, and the molten thermoplastic resin is supplied while foaming by supplying a physical-type foaming agent or a gas thereto from a middle part of the extruder.

Incidentally, in the present invention, the "foaming temperature" means a decomposition temperature in case of a decomposition foaming agent, and a boiling temperature in case of a physical type foaming agent. Incidentally, the "decomposition temperature" means a temperature at which a decomposition degree is reduced to a half in three minutes. However, it is needless to say that the foamable resin composition is in a foamable state at the foaming temperature.

In case of the decomposing type foaming agent, it is preferable to heat the foaming agent at the decomposition temperature with a fraction of +/−20° C. If the temperature exceeds +20° C. relative to the decomposition temperature, dregs decomposes as well. Thus, the amount of the gas generated by the foaming agent can not be constant, so that the shaping ability decreases. On the other hand, if the temperature is less than −20° C. relative to the decomposition temperature, a time required to generate the gas increases, so that the productivity decreases.

In case of a physical type foaming agent, it is required to simply heat the foaming agent more than the boiling temperature. There is no preferable range for the heating temperature.

Next, as a method for supplying a foamable resin composition in an unfoamed state, for example, there is a method wherein after the foamable resin composition is prepared by kneading or permeating a foaming agent into a molten thermoplastic resin at a temperature lower than a foaming temperature of the foaming agent, the thus obtained foamable resin composition is supplied in a desired form, such as a pellet, sheet, rod and pipe.

The foamable resin composition is not necessary to be supplied in a quantity which fully fills an inside of the hollow member, when foamed. Since the hollow member is regulated by a regulating member for a mold to thereby obtain a desired shape, it is sufficient to supply a quantity of the foamable resin composition in which the hollow member is pushed against the regulating member made of metal and so on by the foaming pressure. For example, a mold core is extended to a mold cooling position to regulate foaming so that a product finally obtained may have spaces at various portions. Or, by varying a supplying quantity of the foamable resin composition or a speed of drawing of the hollow member, portions fully filled with foam and portions not fully filled with foam may be formed in the core layer of the obtained fiber-reinforced thermoplastic resin foamed product.

In the present invention, the "foaming pressure" includes not only a forming pressure generated by only the foamable resin composition but also an additional pressure separately applied to an interior when sufficient pressure can not be obtained by only the foamable resin composition to push the hollow member against the regulating member.

In case the additional pressure is applied to the interior, it is preferable to employ a structure, where an air piping is provided through the interior of the regulating member so that a gas can be supplied into the hollow member.

As a method for foaming an unfoamed foamable resin composition supplied into the interior of a hollow member, which is not specifically limited, for example, there is a method wherein hot air is blown from an interior and/or an outer portion of the hollow member. Incidentally, when the foamable resin composition is supplied while foaming, if necessary, the hollow member may be heated.

The hollow member is shaped into a desired form with a foaming pressure generated by foaming of the foamable resin composition, and the method for shaping into a desired form is not limited to a specific one. For example, there are a method wherein a hollow member is supplied into a regulating member, such as a mold having a desired form in the cross section, and a fiber-reinforced thermoplastic resin sheet and the like is pressed against the regulating member to shape into a desired form by the foaming pressure; and a method wherein, depending on a shape of the finally obtained fiber-reinforced thermoplastic resin foamed product, a regulating process by the regulating member is not carried out, and the hollow member is shaped by the foaming pressure.

When a foaming expansion ratio of the inner core layer becomes more than 30 times, the foaming layer itself can not hold the stress and its rigidity is decreased. Therefore, although the foaming expansion ratio is preferably less than 30 times, in combination with reinforcing fibers an optimum rate can be suitably selected. A range of from 1.5 to 5 times is more preferable.

In case a fibrous sheet is used, a foamable resin composition is permeated into fibers while foaming. In order to obtain a core layer having a high foaming expansion ratio, when a thermoplastic resin of a high viscosity for constituting the foamable resin composition is used, the thermoplastic resin may be hardly permeated into the fibers. In such case, it is preferable that a regulating member for regulating a hollow member is gradually made small in its cross section, so that the molten thermoplastic resin can be easily permeated into the fibers.

Specifically, for example, after the fibrous sheet is continuously shaped into a hollow member, a foamable resin composition is supplied to an inner surface of the hollow member, and the foamable resin composition is foamed in a mold. At the same time, the fibrous sheet is oriented toward the inner surface to have a small cross section, so that the thermoplastic resin for constituting the foamable resin composition is readily permeated into the fibrous sheet.

In an eleventh aspect of the invention, it includes a process wherein at least one fiber-reinforced thermoplastic resin sheet partially laminated in a width direction, is continuously shaped into a hollow member, a process wherein a composite foamable sheet comprising a fibrous material containing fibers as a principal component and permeated with a foamable resin composition is supplied into the hollow member to thereby integrally unite with each other; and a process wherein the hollow member is subjected to a vacuum forming and/or an air pressure forming, and at the same time the foamable resin composition is heated to a temperature higher than a foaming temperature of the foaming agent so that the hollow member is enlarged and thickened.

In the eleventh aspect, the same fiber-reinforced thermoplastic resin sheet as described before is used.

A process where a single or a plurality of the fiber-reinforced thermoplastic resin sheets partially laminated in a width direction is continuously shaped into a hollow member, and a shape of the obtained hollow member is the same as those described above.

A composite sheet used in the eleventh aspect comprises a fibrous material containing fibers as a principal component and a foamable resin composition permeated into the fibrous material.

The fibrous material containing fibers as a principal component is not limited to a specific one. The fibrous material may contain the foamable resin composition slightly more than that used in the outer or surface layer of the fiber-reinforced thermoplastic resin foamed product. For example, a swirl mat, continuous mat, chopped strand mat and the like are mentioned.

When a length of the fibers constituting the fibrous material is short, the fibers are not entangled each other, so that the fibrous material can not hold its shape. If it is long, when the hollow member is enlarged and thickened, it is difficult to preferentially orient the fibers in one direction. Therefore, it is preferable that the fibers have a length in a range of from 5 to 100 mm.

When a diameter of the fibers for constituting the fibrous material is small, reinforcing effect is decreased. When it is large, formation into the fibrous material is difficult. Therefore, the diameter is preferably in a range from 1 to 50 micro meters, and more preferably, in a range from 7 to 23 micro meters.

A foamable resin composition used in the eleventh aspect is the same as those explained in the first aspect.

A method for producing the composite foamable sheet is not limited to a specific one. For example, there are a method wherein a molten foamable resin composition is supplied to the fibrous material at a temperature lower than a foaming temperature and pressurized so that the molten foamable resin composition is permeated into the fibrous material to thereby obtain the composite foamable sheet; and a method wherein after a powdery foamable resin composition is supplied into the fibrous material by vibrations or air, the powdery foamable resin composition is melted and permeated into the fibrous material at a temperature lower than a foaming temperature.

In the eleventh aspect, the composite foamable sheet is supplied into an interior of the hollow member to thereby integrate with each other. The integrating method is not limited to a specific one. For example, there are a method wherein after the hollow member provided with the composite foamable sheet therein is supplied into a mold where an outlet in its cross section is smaller than an inlet in its cross section in a tapered state, the mold is held at a temperature higher than a melting temperature of the thermoplastic resin to be used for the hollow member or a thermoplastic resin to be used for the composite foamable sheet, and at a temperature lower than a foaming temperature of a decomposition foaming agent to thereby integrate with each other; and a method wherein the hollow member is pushed from the outside by a regulating member maintained at a temperature higher than a melting temperature of the thermoplastic resin to be used for the hollow member or of the thermoplastic resin to be used for the composite foamable sheet, and at a temperature lower than a foaming temperature of the decomposition foaming agent to thereby integrate with each other.

Thereafter, the hollow member integrated with the composite foamable sheet is subjected to the vacuum forming and/or air pressure forming, and the foamable resin composition is heated to a temperature higher than a foaming temperature of the foaming agent, so that the hollow member is enlarged and thickened. Methods of the vacuum forming and/or the air pressure forming of the hollow member and heating of the foamable resin composition to the temperature higher than the foaming temperature of the foaming agent are carried out in the same manner as described above.

A method for enlarging and thickening the hollow member is not limited to a specific one. For example, it is sufficient that a thickness of the hollow member is enlarged at least in one direction by the vacuum forming and/or the air pressure forming and the foaming pressure. For instance, the hollow member integrated with the composite sheet is supplied into a mold having a cross section larger than that of the hollow member and capable of performing the vacuum forming and/or the air pressure forming, and is enlarged and thickened by the vacuum forming and/or the air pressure forming and the foaming pressure. It is preferable to enlarge the thickness only preferentially in one direction of the hollow member since the fibers are preferentially oriented in a certain direction in the obtained fiber-reinforced thermoplastic resin foamed product to thereby improve a compression strength.

The obtained foaming expansion ratio of the inner core layer is preferably the same range for the same reason as described above, i.e. generally less than 30 times and more preferably 2–5 times.

In the production methods of the fiber-reinforced thermoplastic resin foamed product of the invention, as the surface layer, the fiber-reinforced thermoplastic resin sheet and the like is used, and is shaped into the hollow member. The foamable resin composition is supplied into the inner surface of the hollow member while foaming, or after the foamable resin composition is supplied and then the foamable resin composition is foamed, so that the hollow member is shaped by pressure of the foamable resin composition.

Therefore, it is not necessary to prepare a foamed member beforehand. Further, since the hollow member is shaped by the foaming pressure, an uneven thickness of the surface layer formed of the hollow member hardly occurs.

Since the thermoplastic resin is used for the surface layer and the core layer and the shaping of the layers is performed by the foaming, it is possible to shape into a desire form in a course of production, so that a fiber-reinforced thermoplastic resin foamed product having a complicated cross section is obtained.

Further, the hollow member is pushed from the inner side with uniform force by the resin in a molten state and in a course of foaming with a pressure of foaming of the foamable resin composition to thereby fuse-bond the surface layer and the core layer integrally, so that a partially less fuse-bonding portion is not formed in an interface between the surface layer and the core layer. Therefore, a fiber-reinforced thermoplastic resin foamed product having a uniform quality, such as rigidity, can be obtained.

In case the hollow member is elongated in a course of shaping, a plurality of the fiber-reinforced thermoplastic resin sheets is shaped into the hollow member by overlapping the respective ends thereof so as to correspond to a portion to be elongated. By doing so, the overlapping portions of the respective fiber-reinforced thermoplastic resin sheets are moved, and the respective fiber-reinforced thermoplastic resin sheets are slightly elongated, so that the obtained surface layer is alleviated to be thin, and also partially thin portion is not formed in the surface layer.

Also, by using the composite sheet, since a gas generated from the foamable resin composition does not remain in an interface between the surface layer and the core layer, voids are prevented from being created between the surface layer and the core layer in the obtained fiber-reinforced thermoplastic resin foamed product.

Also, by using the fibrous sheet, the resin is permeated into fibers of the fibrous sheet, so that the fiber-reinforced thermoplastic resin sheet and the like need not be produced beforehand to thereby eliminate the process.

By shaping the hollow member by means of the foaming pressure, the vacuum forming, the air pressure forming or the combination thereof, an accurate fiber-reinforced thermoplastic resin foamed product having a complicated lateral cross section which can not be obtained by only the foaming pressure, can be obtained.

By using the fiber-reinforced thermoplastic resin sheet wherein many continuous fibers are oriented, and by shaping the hollow member so that the continuous fibers are arranged in a longitudinal direction therein, it is possible to produce the fiber-reinforced thermoplastic resin foamed product, while drawing out the hollow member.

By supplying the composite sheet into the hollow member to integrate with each other, and then subjecting the integrated unit to the vacuum forming and/or the air pressure forming to thereby foam and enlarge the thickness of the unit, the fibers for constituting the composite foamable sheet supplied into the hollow member are preferentially oriented in the direction of the enlarged thickness. Thus, the compression strength of the fiber-reinforced thermoplastic resin foamed product can be improved.

Hereinafter, the invention is described in detail with reference to examples. However, the invention is not limited to the examples. Incidentally, in the drawings, "front" means a right direction thereof.

EXAMPLE 1

A fiber-reinforced thermoplastic resin sheet was produced according to a method as described below.

As shown in FIG. 1, 24 strands of glass fiber bundles 1 (4,400 tex.) in a roving form comprising filaments having a diameter of 23 micro meters were arranged respectively in two stages of upper and lower portions; then passed through fluidizing tanks 3 where a powder-form resin composition 2 having a particle diameter of about 80 micro meters and comprising 100 parts by weight of polyvinyl chloride (melt viscosity of $2.4 \times 10^5$ poise), 1 part by weight of a tin-type heat stabilizer, and 0.5 part by weight of polyethylene WAX was fluidized by air fed under pressure from an arrow direction to thereby cause the powder-form resin composition 2 to adhere to the filaments of the glass fiber bundles 1; and thereafter passed through a heating furnace 4 heated to a temperature of about 200° C. so that the resin composition 2 was heated, pressurized and melted to be permeated into the glass fiber bundles and to obtain a fiber-reinforced thermoplastic resin sheet 5 having a thickness of 1.2 mm. Also, after the respective glass fiber bundles 1 were passed through the fluidizing tanks, a net-form glass fiber 6 was sandwiched between the upper and lower fiber bundles 1. Content of the glass fibers in the fiber-reinforced thermoplastic resin sheet 5 was 30% by volume.

Figure 2:
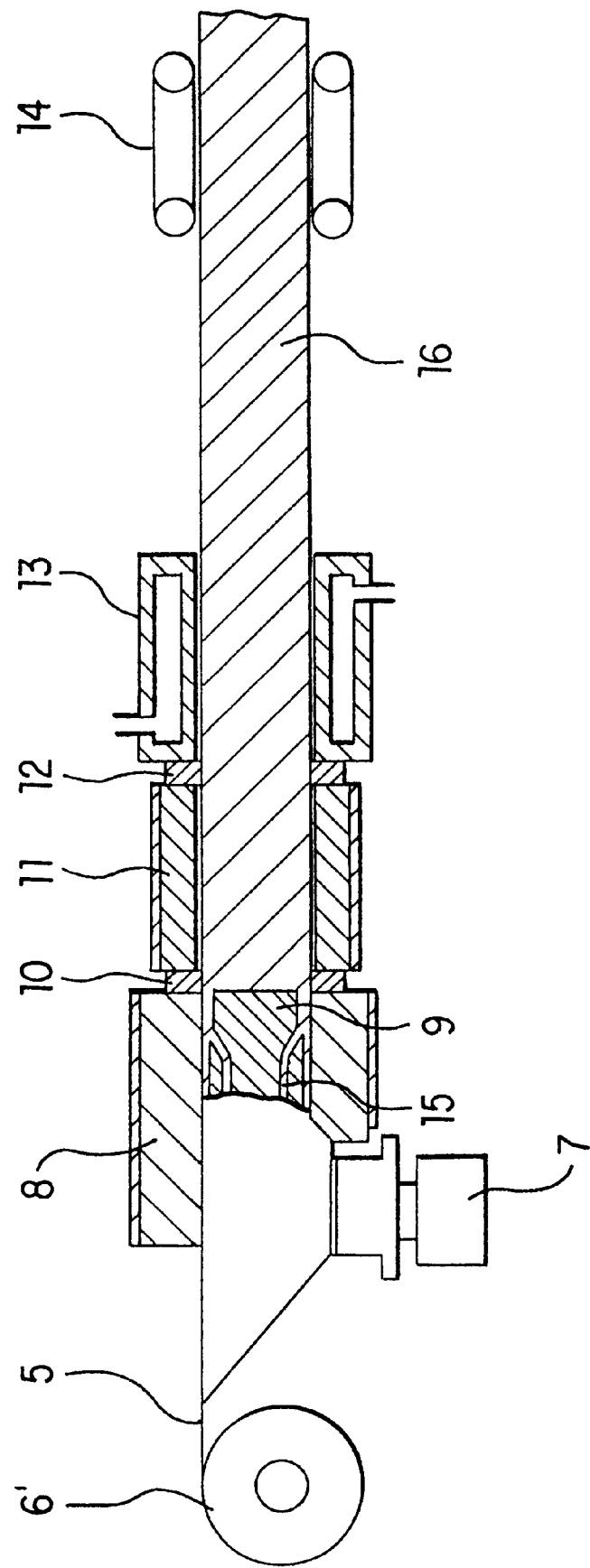
FIG. 2 is a sectional diagram of an apparatus for producing a fiber-reinforced thermoplastic resin foamed product used in Example 1.

An apparatus for producing a fiber-reinforced thermoplastic resin foamed product shown in FIG. 2 comprises an unwinding roll 6' where the above-obtained fiber-reinforced thermoplastic resin sheet 5 with a width of 91 mm and a thickness of 1.2 mm is wound; an extruder 7 for extruding a foamable resin composition; a mold 8 disposed in front of the extruder 7, and having an apex portion bent to make a right angle in front thereof, a circular hole for supplying a foamable resin composition and located in the central portion thereof, and a space for shaping the sheet 5 into a circular shape; an inner core 9 fixed to a rear end portion of the mold 8 to project forwardly and having a circular shape in a vertical cross section; a heat-insulating material 10 provided in front of the mold 8; a heating mold 11; a heat-insulating material 12; a cooling mold 13; and a drawing machine 14 provided in front of the cooling mold 13. A vertical cross-sectional shape of the heating mold 11 is a circle having a diameter of 29 mm. The heat-insulating material 12 in front of the heating mold 11 and the cooling mold 13 have the same cross-sectional shape.

A U-shape clearance for inserting the fiber-reinforced thermoplastic resin sheet 5 is provided at a rear portion of the mold 8, and the fiber-reinforced thermoplastic resin sheet 5 was inserted through the clearance into the mold 8 where the sheet of the U-shape was continuously shaped into a hollow member in which both ends of the sheet 5 abut against each other without overlapping with each other to have an outer diameter of 29.0 mm and a thickness of 1.2 mm. A foamable resin composition 15 comprising 100 parts by weight of polyvinyl chloride, 2.5 parts by weight of a tin-type heat stabilizer, 0.5 part by weight of a lubricant, 8 parts by weight of an acrylic processing aid, 5 parts by weight of $CaCO_3$, 2 parts by weight of dioctyl phthalate and 3.5 parts by weight of sodium bicarbonate (foaming temperature of 175° C.) was beforehand kneaded and pelletized at a resin temperature of 162° C. or lower through a twin-screw extruder having a screw diameter of 30 mm.

The thus pelletized foaming resin composition 15 was extruded through a single-screw extruder (L/D=30, compression ratio 2.5) having a screw diameter of 40 mm at a resin temperature of 200° C., into an interior of the above-obtained hollow member to laminate thereto, and at the same time, was started foaming while maintaining at the resin temperature of 200° C. by the heating mold 11. Thereafter, an outer layer surface temperature of the hollow member was cooled by the cooling mold 13 to a temperature of 60° C., so that a fiber-reinforced thermoplastic resin foamed product 16 having an expansion ratio of 3.2 times in a core layer and a diameter of 29 mm in a circular cross section was continuously produced at a speed of 1.5 m/min.

A bending strength, flexural modulus, compression strength, maximum and minimum values of a surface layer, and CV value of the obtained fiber-reinforced thermoplastic resin foamed product 16 were measured by the follow method and the results are shown in Table 1.

The bending strength and flexural modulus were measured according to JIS K7221.

The compression strength was measured according to a flattening test of JIS G3448, wherein weight by which a distance of a flat plate is reduced to a height of two thirds is divided by an area where the flat plate and a test piece contact at the time of the height of two third.

The maximum and minimum values of a thickness of a surface layer were measured such that ten pieces were cut off, at random, from the obtained fiber-reinforced thermoplastic resin foamed product; the pieces were further divided into ten; the thicknesses of the respective surface layers were measured; and the maximum value and the minimum value thereof were selected.

The CV value was measured such that a standard deviation and an average value were calculated from the above measured values, and the CV value was obtained from the following equation.

$$CV\ value = 100 \times standard\ deviation/average\ value$$

EXAMPLE 2

A fiber-reinforced thermoplastic resin sheet 5' was prepared in the same manner as in Example 1 except that a net-form glass fiber 6 was not sandwiched between the glass fiber bundles 1.

A content of the glass fiber in the fiber-reinforced thermoplastic resin sheet 5' was 50% by volume.

The mold 11 in the production apparatus used in Example 1 was changed to have a diameter of 29 mm in an inlet circular cross section, a rectangle of 27×27 mm in an outlet shape and an inner cross section shape of the mold where the inlet shape was gradually changed to the outlet shape. Except the mold 11, the production apparatus used in Example 1 was not changed, and a fiber-reinforced thermoplastic resin foamed product 16 having an expansion ratio of 2.8 times in a core layer and a rectangular cross section of 27×27 mm was continuously produced in the same manner as in Example 1, at a speed of 1.2 m/min.

A bending strength, flexural modulus, maximum and minimum values of a thickness of the surface layer and CV value of the obtained fiber-reinforced thermoplastic resin foamed product 16 were measured by the same methods as in Example 1. A compression strength of the fiber-reinforced thermoplastic resin foamed product 16 was measured by the following method. The results of the above measured values are shown in Table 1.

A compression strength was measured according to JIS K7208.

EXAMPLE 3

A fiber-reinforced resin sheet was obtained by heating and pressing three fiber-reinforced thermoplastic resin basic sheets which had been prepared previously, to thereby integrate with each other. The fiber-reinforced thermoplastic resin basic sheet was produced by using an apparatus shown in FIG. 3.

The apparatus includes a fluidizing tank 17, a plurality of unwinding rolls 18 disposed in parallel at a rear side of the fluidizing bed 17; take-up drive rolls 19 disposed at an upstream side of the respective fluidizing bed; rotary cutters 20 provided in front of the respective take-up drive rolls 19 in a face-to-face state; and upper and lower endless belts 21, 22 opposed to each other with a predetermined space therebetween. In the opposed feeding portions of the endless belts 21, 22, a heating furnace 23, a thickness adjusting device 28, and upper and lower cooling guide rolls 24 are provided, in the stated order, from the rear side. A feeding portion 22b is located at the rear side of the lower endless belt 22 and under the rotary cutter 20.

By driving one of the upper pulleys 27 and one of the lower pulleys 27 by a motor, both endless belts 21, 22 are continuously moved in the same direction at about the same speed. A rear part of a transferring portion 21a of the upper endless belt 21 is inclined upwardly so that a space between the upper and lower transferring portions 21a, 22a is widened toward the rear portion thereof. The upper and lower endless belts 21, 22 are made of steel having a high strength and heat resistance. The heating furnace 23 having a hot-air circulating system are used, and the upper and lower transferring portions 21a, 22a of the upper and lower endless belts 21, 22 pass through the heating furnace.

In the above apparatus, 15 strands of the reinforced fiber bundles 25A (fiber diameter of 17 micro meters) formed of glass fiber bundles in a roving state and unwound from the unwinding roll 18 were guided into the fluidizing bed 17, and passed through a fluidizing bed 26, where particles of high density polyethylene (melt viscosity of $1.1 \times 10^5$ poise) subjected to refrigeration pulverization were fluidizing, in a fiber open state, so that the resin was adhered to the reinforced fibers at a volumetric ratio of 3:2. The fiber bundles 25B adhered with the resin were cut into pieces of 37.5 mm by the rotary cutters 20, so that the cut resin adhered fiber bundles 25C fell onto the portion 22b for supplying to the space between the upper and lower endless belts 21, 22 to accumulate. The collected cut resin adhered fiber bundles 25D were passed through the heating furnaces 23 in which hot air was circulated, while pressing the collected cut bundles 25D in a thickness direction by sandwiching between the moving upper and lower endless belts. Then, a mixture of the resin in a molten state and reinforced fiber bundles was cooled while pressing to thereby obtain a fiber-reinforced thermoplastic resin base sheet 25E with a thickness of 0.5 mm where the reinforced fibers with the length of 37.5 mm were disposed at random in the thermoplastic resin.

Content of the glass fiber in the fiber-reinforced thermoplastic resin base sheet 25E was 40% by volume.

Also, a fiber-reinforced thermoplastic resin base sheet 25F (not shown) was obtained in the same manner as in Example 2 except that high density polyethylene having a particle diameter of 80 micro meters was used as a powder state resin composition, and that a thickness of the obtained resin sheet 25F was adjust to 0.3 mm.

The fiber-reinforced thermoplastic resin base sheet 25E was sandwiched between the two fiber-reinforced thermoplastic resin basic sheets 25F to integrate with each other to thereby obtain a fiber-reinforced thermoplastic resin sheet 5' of a thickness of 1.2 mm.

Hundred parts by weight of high density polyethylene, 100 parts by weight of homopolypropylene, 30 parts by weight of cross-linking silane modified polypropylene, 5 parts by weight of azodicarbonamide (foaming temperature of 190° C.) and 10 parts by weight of glass fibers (filament diameter of 14 micro meters, fiber length of 2 mm) were fed into a twin-screw extruder having a screw diameter of 30 mm, melt-kneaded at a temperature of 175° C., and pelletized. The obtained pellets were soaked in hot water of 100° C. for one hour, and then dried to obtain foamable resin compositions.

As shown in FIG. 2, the above obtained pellets were fed into a single-screw extruder (L/D=30, compression ratio of 2.5) having a screw diameter of 40 mm, melt-kneaded at a temperature of 165° C., and extruded to laminate in an unfoamed state. The thus extruded laminate was heated in a heating mold 11 controlled at a temperature of 205° C. to start foaming, and after the foamed resin was filled in an inner surface of the hollow member, the laminate was guided into a cooling mold 13 to cool a surface thereof to a temperature of 60° C. Also, though not shown, an air vent was provided in an interior of the mold core 9 at a rear side thereof, so that a pressure of a space formed in the vicinity of the forward end of the mold core 9 was adjusted to be 1.3 kg/cm². The surfaces of the heating mold 11 and the cooling mold 13 to which the hollow member contacts were covered with tetrafluoroethylene, and a formation speed of 1.8 m/min was adopted. Except the above, a fiber-reinforced thermoplastic resin foamed product 16 having an expansion ratio of 2.9 times in the core layer and a rectangular cross-section of 27×27 mm was obtained in the same manner as in Example 2.

A bending strength, flexural modulus, compression strength, maximum and minimum values of a thickness of the surface layer and CV value of the obtained fiber-reinforced thermoplastic resin foamed product 16 were measured in the same manner as in Example 2, and the results are shown in Table 1.

EXAMPLE 4

A fiber-reinforced thermoplastic resin sheet 29A was produced in the same manner as in Example 2 except that polypropylene (melt viscosity of $1.6 \times 10^5$) subjected to refrigeration pulverization and having an average particle diameter of 100 micro meters was used as a thermoplastic resin. Content of glass fibers in the fiber-reinforced thermoplastic resin sheet 29A was 40% by volume.

Figure 4:
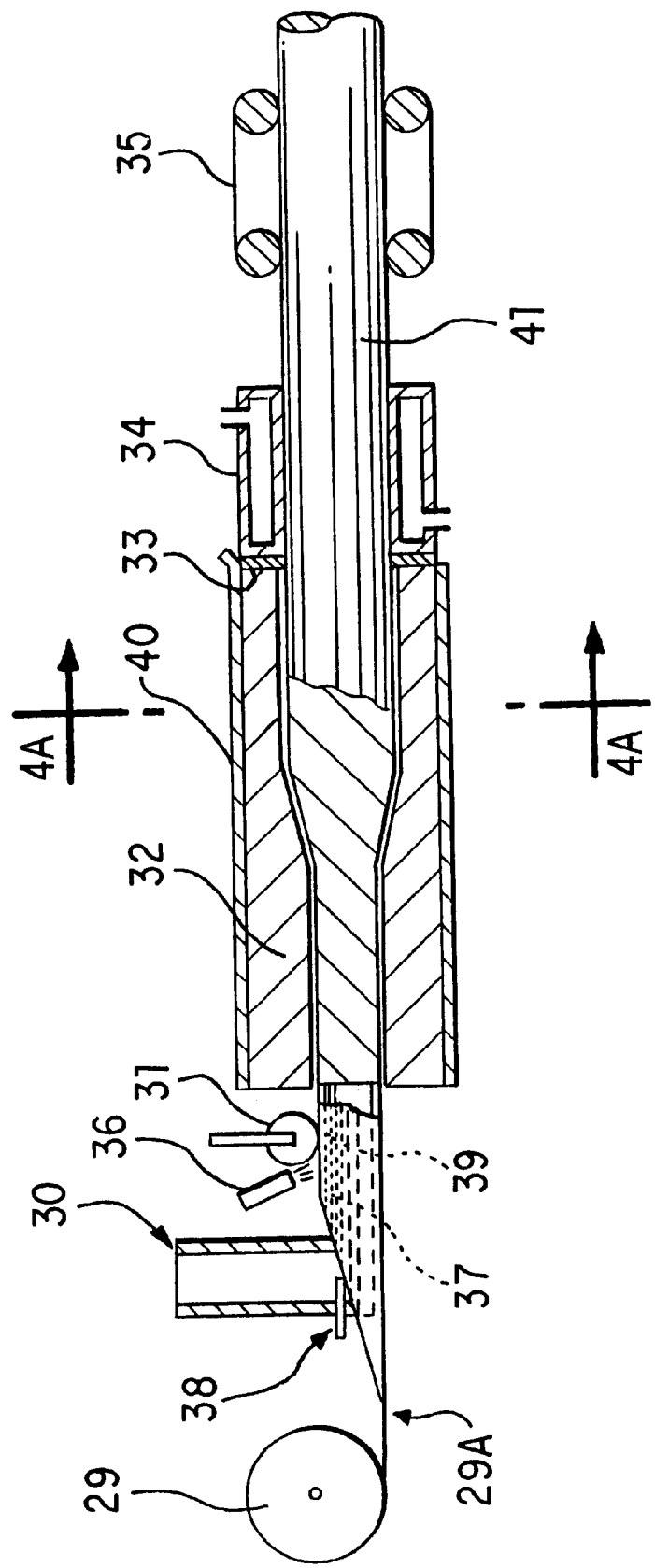
FIG. 4 is a sectional diagram of an apparatus for producing a fiber-reinforced thermoplastic resin foamed product used in Example 4.
Figure 4A:
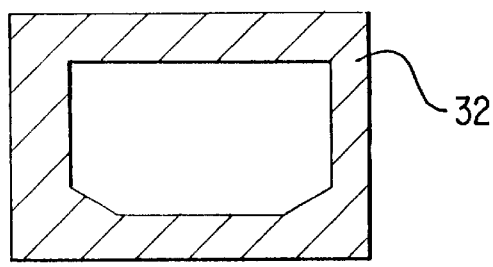

An apparatus for producing a fiber-reinforced thermoplastic resin foamed product shown in FIG. 4 comprises an unwinding roll 29 where the fiber-reinforced thermoplastic resin sheet 29A is wound; an inner layer foaming resin composition supplying device 30 with a tip portion bent forward for shaping the sheet 29A into a rectangle form and disposed in front of the unwinding roll 29; a pressing roll 31 for pressing both ends of the fiber-reinforced thermoplastic resin sheet 29A; a shaping mold 32 having a cross section gradually changing from a rectangle of 50 mm in width×25 mm in thickness to a rectangle of 60 mm in width×30 mm in thickness and a shape where both lower corners were cut away as shown in FIG. 4-1; a band heater 40 surrounding the shaping mold 32 and heating the shaping mold 32; a heat insulating material 33 and a cooling mold 34 provided in front of the band heater 40; and a drawing machine 35 provided in front of the cooling mold 34. The supplying device 30 includes a foaming resin composition supplying path 37, an air hole 38, and a mesh for passing only air provided in front of the air vent, though they are not shown. Further, a hot air heating device 36 for heating overlapped portions in the end portions of the sheet is provided. Also, not shown, the apparatus is provided with a guide roll for shaping a sheet around a circumference of the supplying device 30 into a rectangular shape.

The fiber-reinforced thermoplastic resin sheet 29A obtained above was continuously shaped into a rectangle, and after overlapped portions were heated by the hot air heating device 36 at 150° C., the portions were closely contacted to each other by the roll 31 to thereby obtain a hollow member. The hollow member was continuously drawn so that the hollow member was sent into the shaping mold 32, and at the same time a foaming resin composition 39 was supplied through the foaming resin composition supplying path 37 to an inner surface of the hollow member under an unfoamed state at a resin temperature of 80° C. The foaming resin composition 39 was prepared by pelletizing a mixture comprising 100 parts by weight of high density polyethylene, 100 parts by weight of homopolypropylene, 30 parts by weight of cross-linking silane modified polypropylene and azodicarbonamide (foaming temperature of 190° C.), in the same manner as in Example 3.

The shaping mold 32 was heated to 205° C. by the band heater 40, and the sheet 29A was drawn while adjusting the speed so that the foaming resin composition started to foam in the interior of the mold 32, especially, at the gently sloping portion in the cross section thereof. The foaming resin was shaped by elongating the fiber-reinforced thermoplastic resin sheet 29A in a width direction and at the same time pushing the sheet 29A against an inner surface of the mold 32 with a foaming pressure. The shaped sheet 29A was taken and passed through the cooling mold 34 where cooling water at a temperature of 5° C. was circulating to thereby cool a surface layer temperature to about 40° C., so that a fiber-reinforced thermoplastic resin foamed product 41 was continuously obtained at a formation speed of 0.5 mi/min and an expansion ratio in the core layer of 2.85 times.

A bending strength, flexural modulus,, compression strength, maximum and minimum values of a thickness of the surface layer and CV value of the obtained fiber-reinforced thermoplastic resin foamed product 41 were measured in the same manner as in Example 2, and the results are shown in Table 1.

EXAMPLE 5

A fiber-reinforced thermoplastic resin sheet 42B was obtained in the same manner as in Example 1 except that polypropylene (melt viscosity of $1.6 \times 10^5$ poise) was used as a powder-form resin composition.

Figure 3:
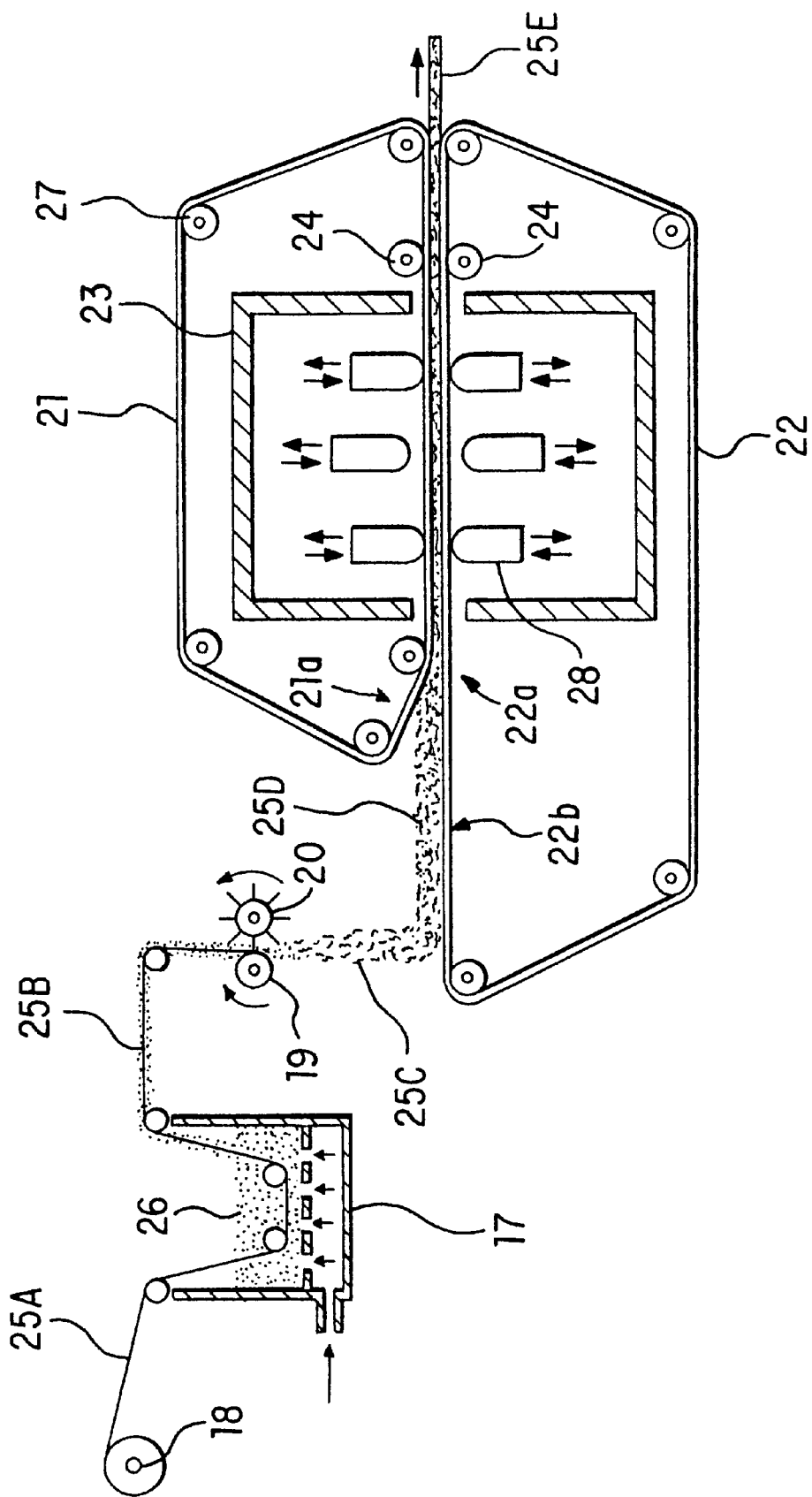
FIG. 3 is a sectional diagram of an apparatus for producing a fiber-reinforced thermoplastic resin sheet used in Example 3.
Figure 5A:
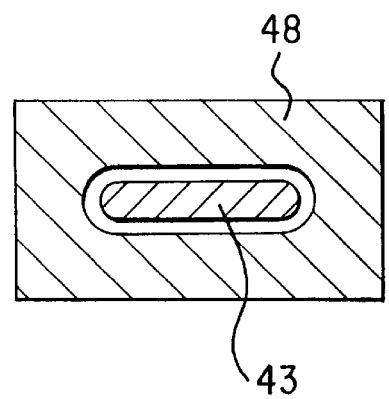
FIG. 5 is a sectional diagram of an apparatus for producing a fiber-reinforced thermoplastic resin foamed product used in Example 5.
Figure 5B:
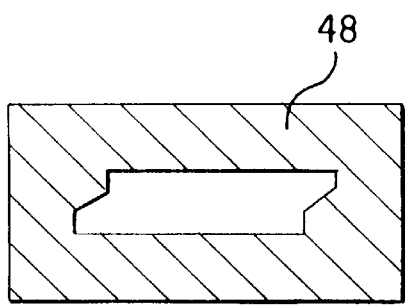
Figure 5C:
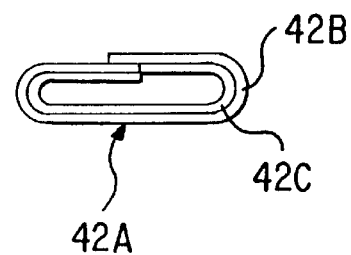
Figure 5:
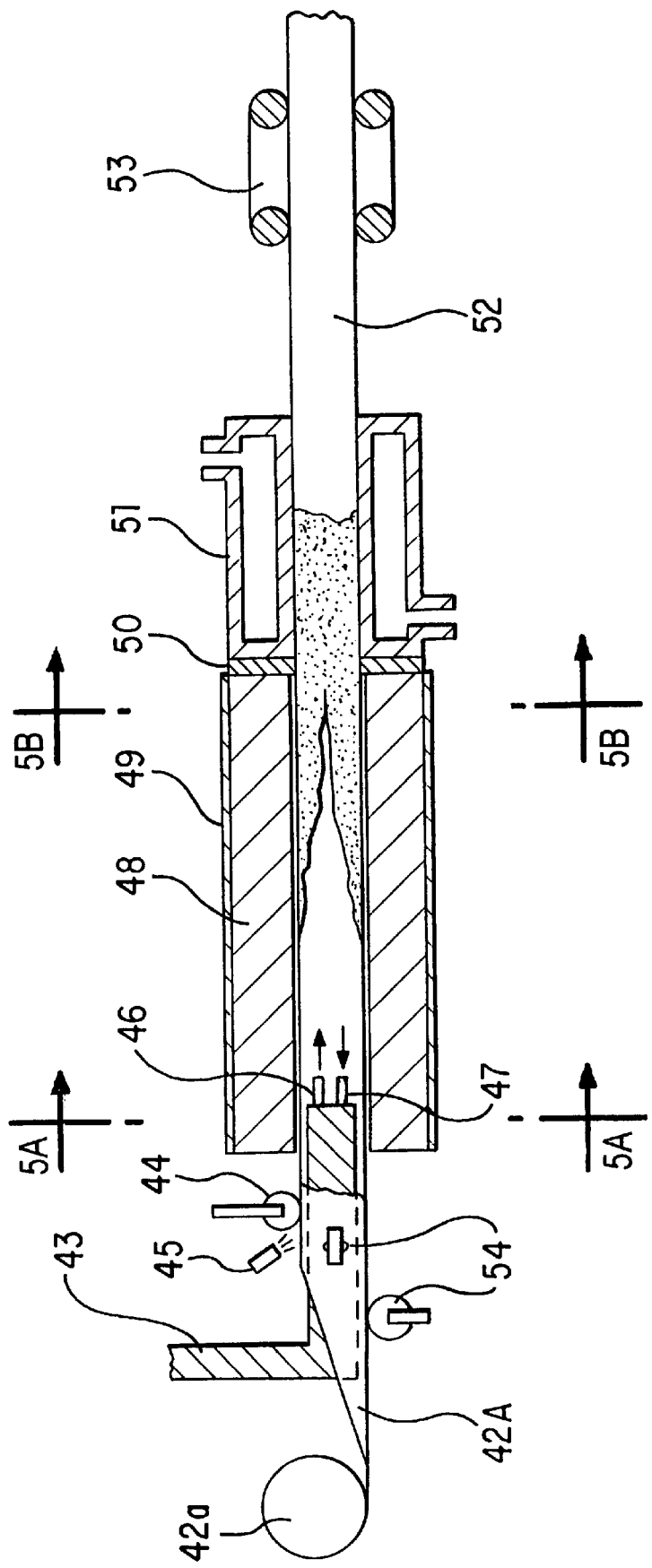

Further, a mixture of 100 parts by weight of high density polyethylene, 15 parts by weight of cross-linking silane modified polypropylene, 5 parts by weight of azodicarbonamide (foaming temperature of 190° C.) and 10 parts by weight of glass fiber (filament diameter of 14 micro meter, fiber length of 5 mm) was supplied to a twin-screw extruder having a screw diameter of 30 mm and heated at 170° C. to melt. Thereafter, the molten resin was extruded in a sheet form with 1 mm thickness onto the above-obtained fiber-reinforced thermoplastic resin sheet 42B to laminate, so that a composite sheet 42A with a thickness of 2 mm and a width of 204 mm formed of the fiber-reinforced thermoplastic resin layer 42B and a foaming resin composition layer 42C laminated on one side of the layer 42B was obtained. The obtained composite sheet 42A was soaked in hot water at 100° C. for one hour and then dried. As shown in FIG. 5-3, the thus obtained composite sheet 42A was not laminated, in one end thereof, with the foamable resin composition layer for a width of 20 mm.

A production apparatus used in Example 5 is shown in FIG. 5. The apparatus comprises an unwinding roll 42a where the above-obtained composite sheet 42A is wound; a mold 43 for shaping the composite sheet 42A into a hollow member, having a tip portion bent at a right angle in a forward direction and provided with an inlet port 46 and an exhausting hole 47 in the interior thereof; guide rolls 54 for shaping the composite sheet 42A into a hollow form and provided along the mold 43 therearound; a heating device 45 for heating overlapped portions of the respective ends of the composite sheet 42A; a pressing roll 44 for press-contacting the overlapped portions heated by the heating device 45; a heating mold 48 having an ellipse in an inlet cross section as shown in FIG. 5-1 and gradually changing toward the front side thereof so that an outlet cross section has a shape as shown in FIG. 5-2; a heat insulating material 50 having the cross sectional shape as shown in FIG. 5-2; a cooling mold 51; and a drawing machine 53.

The composite sheet 42A was shaped into a hollow form by using the mold 43 and the guide roll 54 so that the foaming resin composition layer became an inner layer and a portion where the foaming resin composition layer was not laminated became an overlapping portion, and the overlapped portion was heated by the heating device 45 at 190° C. and closely contacted by the pressing roll 44.

Further, the obtained hollow member was supplied to the mold 48 heated to 200° C., while hot air of 225° C. was supplied into the interior of the hollow member through the inlet port 46 and at the same time the air was exhausted through the exhausting port 47 to thereby foam the foamable resin composition layer. After completion of the foaming, the surface layer was cooled in the cooling mold 51 to a temperature of 60° C. on the outer layer surface to thereby obtain a fiber-reinforced thermoplastic resin foamed product 52 with an expansion ratio of 4.7 times at a formation speed of 1.2 m/min.

A bending strength, flexural modulus and compression strength, minimum and maximum values of a thickness of the surface layer and CV value of the obtained fiber-reinforced thermoplastic resin foamed product 52 were measured in the same manner as in Example 2, and the results are shown in Table 1.

EXAMPLE 6

A continuous mat (weight per area of 450 g/m$^2$, width of 94.2 mm) where continuous glass fiber bundles of monofilaments having a diameter with 9 micro meters were combined at random and held by an epoxy resin series bonding agent was used as a fibrous sheet.

Figure 6:
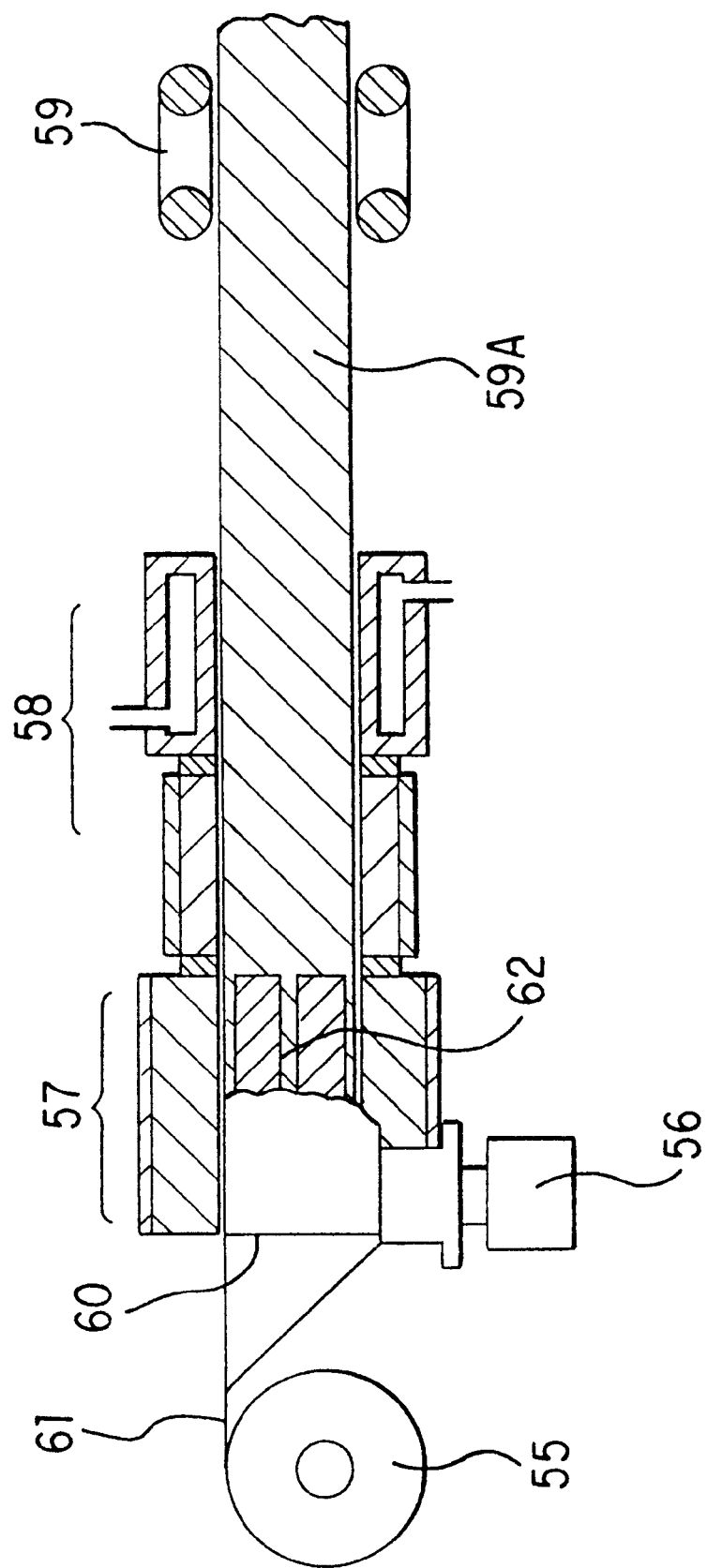
FIG. 6 is a sectional diagram of an apparatus for producing a fiber-reinforced thermoplastic resin foamed product used in Example 6.

A production apparatus, as shown in FIG. 6, comprises an unwinding machine 55 for feeding the fibrous sheet, a foamable resin composition extruder 56, a foamable resin composition extruding mold 57, a heating and cooling mold 58 and a drawing machine 59. The foamable resin composition extruding mold 57 has a structure such that when a fibrous sheet 61 is passed from a fibrous sheet inserting portion 60 having a U-shape to a foamable resin composition extruding port, the fibrous sheet 61 is gradually shaped into a hollow form in the interior of the foamable resin composition extruding mold 57, and the respective end portions abut against each other to thereby form a complete hollow shape. The foamable resin composition extruding mold 57 is connected to the foamable resin composition extruder 56 at a portion where the fibrous sheet 61 is not shaped into a complete hollow form.

A foamable resin composition flow path 62 is provided from a connecting portion between the extruder 56 and the foamable resin composition extruding mold 57 to a portion where the fibrous sheet 61 becomes a complete hollow shape, so that the foamable resin composition in a strand form with a diameter of 5 mm is extruded to an inner surface of the fibrous sheet 61 in a hollow form.

The heating and cooling mold 58 has the same cross section as that of an obtained product, and it is possible to heat by a heater and to cool by passing water. Cross sections of the foamable resin composition extruding port of the foamable resin composition extruding mold 57 and the heating and cooling mold 58 have circular shapes with a diameter of 30 mm.

The fibrous sheet 61 was inserted into the foamable resin composition extruding mold 57 adjusted to a temperature of 180° C. through the fibrous sheet inserting portion, and shaped into a hollow member in the interior of the mold. Thereafter, a foamable resin composition was supplied to an inner surface of the hollow member through a foamable resin composition extruder 56 and the flow path 62 of the mold 57 while foaming at a temperature of 185° C. The above foamable resin composition was obtained by stirring and mixing, to become a temperature of 100° C. by a super-mixer, a mixture comprising 100 parts by weight of polyvinyl chloride, 2.5 parts by weight of tin-series heat stabilizer, 1 part by weight of lubricant, 12 parts by weight of acrylic processing aid, 2 parts by weight of $CaCO_3$, 2 parts by weight of dioctyl phthalate and 5 parts by weight of sodium bicarbonate (foaming temperature of 175° C.).

After the foamable resin composition was extruded into the hollow member, the hollow member with the resin composition therein was guided into the heating and cooling mold 58 connected to the foamable resin composition extruding mold 57, and while foaming at the heating portion heated to 180° C., the foamed polyvinyl chloride was permeated into the continuous <mat. Then, the polyvinyl chloride permeated mat was cooled to 70° C. in a surface temperature in the cooling portion cooled to 10° C. to thereby obtain a fiber-reinforced thermoplastic resin foamed product 59A. The obtained fiber-reinforced thermoplastic resin foamed product had a two layer structure including a surface layer comprising a glass fiber containing polyvinyl chloride and a core layer comprising a polyvinyl chloride foamed member provided inside the surface layer, and the core layer had an expansion ratio of 3.55 times.

A bending strength, flexural modulus, compression strength, minimum and maximum values of a thickness of the surface layer and CV value of the obtained fiber-reinforcing thermoplastic resin foamed product 59A were measured in the same manner as in Example 1, and the results are shown in Table 1.

EXAMPLE 7

The fibrous sheet obtained in Example 5 was used as a fibrous sheet 64.

Figure 7:
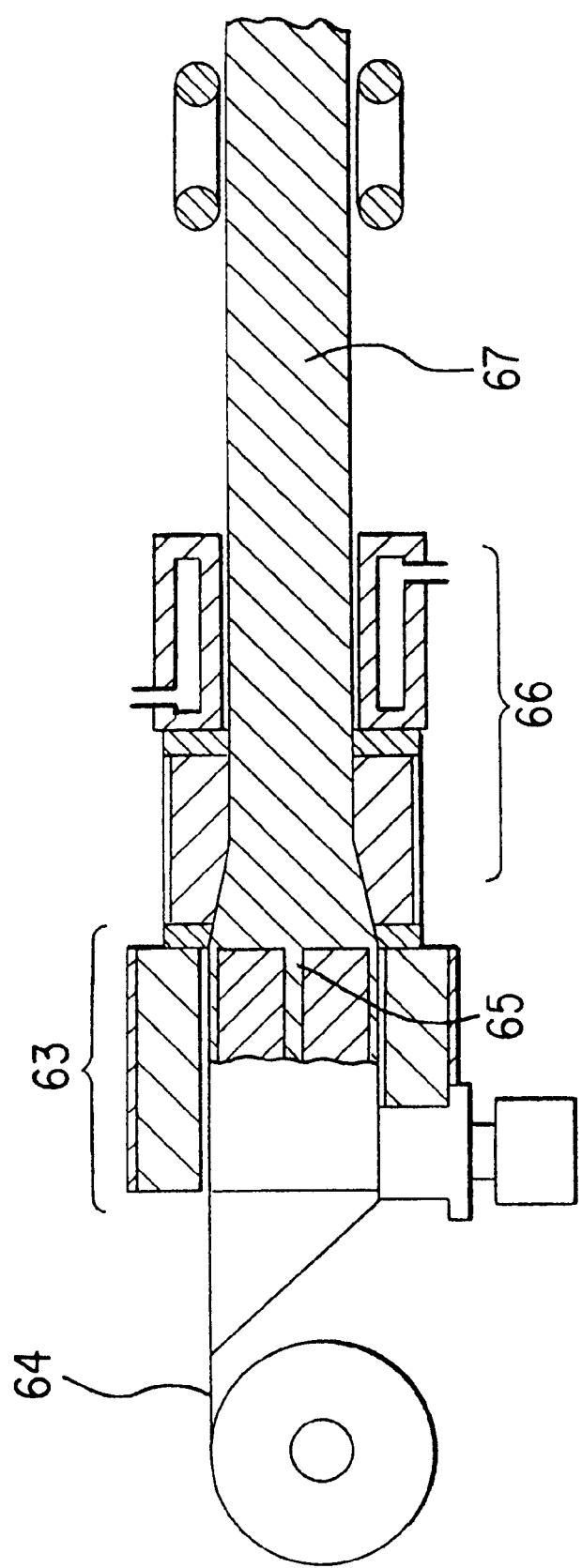
FIG. 7 is a sectional diagram of an apparatus for producing a fiber-reinforced thermoplastic resin foamed product used in Example 7.

A process used in Example 7 is shown in FIG. 7. A foamable resin composition extruding mold 63 had the same structure as that used in Example 5. A cross section of a fibrous sheet shaping path at an outlet portion of a resin extruding port 65 had a circle with 109.9 mm in its circumferential length, and a cross section of an area from the resin extruding port 65 to a heating and cooling mold 66 connected to the foamable resin composition extruding mold 63 was gradually reduced to a circle having a circumferential length of 92.4 mm of the heating and cooling mold 66.

A foamable resin composition obtained by a super mixer by heating to a temperature of 100° C., a mixture comprising 100 parts by weight of polyvinyl chloride, 2.5 parts by weight of a tin-series heat stabilizer, 0.6 part by weight of a lubricant, 3 parts by weight of an acrylic processing agent, 5 parts by weight of $CaCO_3$, 1 part by weight of dioctyl phthalate and 5 parts by weight of sodium bicarbonate (foaming temperature of 175° C.), was used. As a production apparatus, the above-mentioned apparatus was used, and a fiber-reinforced thermoplastic resin foamed product 67 was obtained in the same manner as in Example 6.

The obtained fiber-reinforced thermoplastic resin foamed product had a two layer structure including a surface layer comprising glass fiber containing polyvinyl chloride and a core layer comprising a polyvinyl chloride foamed member disposed inside the surface layer. The core layer had an expansion ratio of 3.73 times.

A bending strength, flexural modulus, compression strength, minimum and maximum values of a thickness of the surface layer and CV value of the obtained fiber-reinforcing thermoplastic resin foamed product 67 were measured in the same manner as in Example 1, and the results are shown in Table 1.

EXAMPLE 8

A fiber-reinforced thermoplastic resin foamed product 59A was obtained in the same manner as in Example 6, except that a foamable resin composition was supplied to an inner surface of a hollow member under an unfoamed state at a temperature of 165° C. through the extruder for extruding the foamable resin composition, and a heating portion of the heating and cooling mold was heated to 190° C. to thereby foam the foamable resin composition.

The obtained fiber-reinforced thermoplastic resin foamed product had a two layer structure including a surface layer comprising a glass fiber containing polyvinyl chloride and a core layer comprising a polyvinyl chloride foamed member provided inside the surface layer, and the core layer had an expansion ratio of 2.10 times.

A bending strength, flexural modulus, compression strength, minimum and maximum values of a thickness of the surface layer and CV value of the obtained fiber-reinforcing thermoplastic resin foamed product 59A were measured in the same manner as in Example 1, and the results are shown in Table 1.

EXAMPLE 9

A fiber-reinforced thermoplastic resin foamed product 67 was obtained in the same manner as in Example 7, except that a foamable resin composition was supplied to an inner surface of a hollow member under an unfoamed state at a temperature of 162° C. through the extruder for extruding the foamable resin composition, and a heating portion of the heating and cooling mold was heated to 190° C. to thereby foam the foamable resin composition.

The obtained fiber-reinforced thermoplastic resin foamed product had a two layer structure including a surface layer comprising a glass fiber containing polyvinyl chloride and a core layer comprising a polyvinyl chloride foamed member provided inside the surface layer, and the core layer had an expansion ratio 2.0 times.

A bending strength, frexural modulus, compression strength, maximum and minimum values of a thickness of the surface layer and CV value of the obtained fiber-reinforced thermoplastic resin foamed product 67 were measured in the same manner as in Example 1, and the results are shown in Table 1.

EXAMPLE 10

A fiber-reinforced thermoplastic resin sheet 128 was obtained in the same manner as in Example 1, except that a powder-form resin composition comprising 100 parts by weight of polyvinyl chloride, 1 part by weight of a tin-series heat stabilizer and 0.7 part by weight of polyethylene WAX, was used.

A fiber-reinforced thermoplastic resin foamed product was produced by using an apparatus shown in FIG. 18.

The apparatus comprises unwinding rolls 129 where fiber-reinforced thermoplastic resin sheets 128 are wound, respectively; slit members 130, 131 provided in front of the unwinding rolls 129 and having cross sections as shown in FIGS. 18-1, 18-2, and through-holes at an inside thereof through which the fiber-reinforced thermoplastic resin sheet can pass; a heating roll 143 for heating overlapped portions of the fiber-reinforced thermoplastic resin sheets 128; an extruder 132, provided in front of the heating roll 143, for supplying the foamable resin composition, with a tip portion bent at a right angle in a forward direction, and disposed to have a space between tip portion of a mold 142 and the extruder 132; molds 142, 145 for shaping the fiber-reinforced thermoplastic resin sheet 128 into a circular form; a slit member 133 located between the molds 142 and 145, and having a cross section as shown in FIG. 18-3 and a through-hole at an inside thereof through which the fiber-reinforced thermoplastic resin sheet 128 can pass; a slit member 134 provided in front of the mold 145, and having a cross section as shown in FIG. 18-4 and a through-hole at an inside thereof through which the fiber-reinforced thermoplastic resin sheet 128 can pass; a mold 146 provided in front of the slit member 134, and having an inlet cross section of a circular shape and an outlet cross section of a rectangular shape having a width of 12 mm and a thickness of 90 mm by gradually changing therebetween; a heating roll 135 for heating one end of overlapped portions of the fiber-reinforced thermoplastic resin sheets 128; a heating mold 136 installed near the mold 146 through a heat insulating material 141, formed of heating molds 139 and 140, and having an inlet cross section of a rectangular shape with a width of 12 mm and a thickness of 90 mm and an outlet cross section as shown in FIG. 18-5 by gradually changing therebetween; a cooling mold 138 provided in front of the heating mold 136 through a heat insulating material 137 and having a cross section corresponding to the outlet cross section of the heating mold 136; and a drawing machine 144.

The obtained fiber-reinforced thermoplastic resin sheets 128 were passed through the through-holes of the slit members 130 and 131 by taking out from the unwinding rolls 129, so that one ends of the respective fiber-reinforced thermoplastic resin sheets 128 are overlapped with each other by the slit members 130 and 131. The overlapped portions were heated by the heating roll 143 at a temperature of 200° C. to thereby fuse-bond.

Further, the fiber-reinforced thermoplastic resin sheets 128, one ends of which were fuse bonded, were inserted into the mold 142 held at a temperature of 150° C., and then passed through the slit members 133 and 134, the molds 145 and 146 held at a temperature of 175° C., and then the heating roll 135 held at a temperature of 200° C. to thereby obtain a hollow member of a cross section of a rectangular shape having a width of 90 mm and a thickness of 12 mm (FIG. 18-6).

A foamable resin composition comprising 100 parts by weight of polyvinyl chloride, 2.5 parts by weight of a tin-series heat stabilizer, 0.5 parts by weight of lubricant, 8 parts by weight of an acrylic processing assistant, 3.5 parts by weight of $CaCO_3$, 2 parts by weight of dioctyl phthalate and 2.1 parts by weight of sodium bicarbonate (foaming temperature of 175° C.) was supplied to the extruder 132, and the foamable resin composition was extruded into the interior of the hollow member at a resin temperature of 180° C. while foaming.

While maintaining the heating mold 136 at a temperature of 180° C., the hollow member was shaped by the foaming pressure to thereby complete the foaming, and cooled by the cooling mold 138 to a temperature of 60° C. in the surface layer, so that a fiber-reinforced thermoplastic resin foamed product 147 was formed at a speed of 1.5 m/min with an expansion ratio of 2.5 times in the core layer.

A bending strength, flexural modulus, compression strength, maximum and minimum values of a thickness of the surface layer and CV value of the obtained fiber-reinforced thermoplastic resin foamed product 147 were measured in the same manner as in Example 2, and the results are shown in Table 1.

EXAMPLE 11

A fiber-reinforced thermoplastic resin sheet 128' having glass fibers of 40% by volume was obtained in the same manner as in Example 10 except that polypropylene having an average particle diameter of 100 micro meters was used as a powder-form thermoplastic resin. Except that the space between the mold 142 and a forward end of the extruder 132 was removed; the extruder was provided with a core member at the center of the tip portion thereof; the heating rolls 135 and 143 were held at a temperature of 150° C.; a foamable resin composition was supplied to the inner surface of the hollow member at a temperature of 120° C., the heating molds 139 and 140 were held at temperatures of 210 and 200° C. respectively; the surface layer was cooled down to 40° C. by the cooling mold 138; and the forming speed was 0.5 m/min, a fiber-reinforced thermoplastic resin foamed product 147' was obtained in the same manner as in Example 10. The above foamable resin composition was obtained by supplying a mixture comprising 100 parts by weight of high density polyethylene, 100 parts by weight of homopolypropylene, 40 parts by weight of cross-linking silane modified polypropylene and 5 parts by weight of azodicarbonamide (foaming temperature of 190° C.), to a twin-screw extruder of a diameter of 30 mm, melt-kneading the mixture at a temperature of 170° C., extruding the mixture into a sheet form having a width of 80 mm and a thickness of 3 mm, thereafter soaking the sheet in hot water of 100° C. for one hour and drying the sheet.

A bending strength, flexural modulus, compression strength, maximum and minimum values of a thickness of the surface layer and CV value of the obtained fiber-reinforced thermoplastic resin foamed product 147' were measured in the same manner as in Example 2, and the results are shown in Table 1.

EXAMPLE 12

A composite sheet 42A was obtained in the same manner as in Example 5, except that the composite sheet having a width of 110 mm was prepared where the foamable resin composition layer was not laminated at both end portions in a length of 10 mm.

Figure 19:
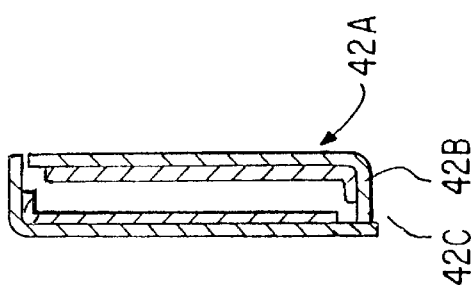
FIG. 19 is a view showing a sectional shape of the hollow member at an inlet port of a heating mold in Example 18.

A fiber-reinforced thermoplastic resin foamed product 52 was obtained in the same manner as in Example 5, except that the obtained two composite sheets 42A were shaped into a hollow member as shown in FIG. 19.

A bending strength, flexural modulus, compression strength, maximum and minimum values of a thickness of the surface layer and CV value of the obtained fiber-reinforced thermoplastic resin foamed product 52 were measured in the same manner as in Example 2, and the results are shown in Table 1.

EXAMPLE 13

Figure 20:
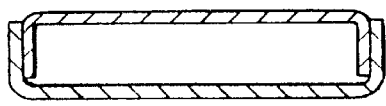
FIG. 20 is a view for showing a sectional shape of the hollow member at the inlet port of a heating mold in Example 22.

A fiber-reinforced thermoplastic resin foamed product 147" was obtained in the same manner as in Example 10, except that two fibrous sheets with a width of 110 mm used in Example 6 were used instead of the fiber-reinforced thermoplastic resin sheet 128, and shaped into a hollow member as shown in FIG. 20.

A bending strength, frexural modulus, compression strength, maximum and minimum values of a thickness of the surface layer and CV value of the obtained fiber-reinforced thermoplastic resin foamed product 52' were measured in the same manner as in Example 2, and the results are shown in Table 1.

EXAMPLE 14

A fiber-reinforced thermoplastic resin foamed product 52 was obtained in the same manner as in Example 13, except that a foamable resin composition was supplied at a resin temperature of 165° C. in an unfoamed state, and started to foam in a heating mold at a temperature of 195° C. to thereby shape a hollow member by the foaming pressure.

A bending strength, flexural modulus, compression strength, maximum and minimum values of a thickness of the surface layer and CV value of the obtained fiber-reinforced thermoplastic resin foamed product 52 were measured in the same manner as in Example 2, and the results are shown in Table 1.

EXAMPLE 15

A fiber-reinforced thermoplastic resin sheet 5 having a thickness of 1.2 mm, a width of 91 mm and a glass fiber content of 30% by volume was obtained in the same manner as in Example 1, except that a powder-form resin composition comprising 100 parts by weight of acetic acid-vinyl chloride copolymer (melt viscosity of $1.7 \times 10^5$ poise), 2 parts by weight of tin-series stabilizer and 0.5 part by weight of polyethylene WAX was used, and a temperature of the heating furnace 4 was 210° C.

Figure 10:
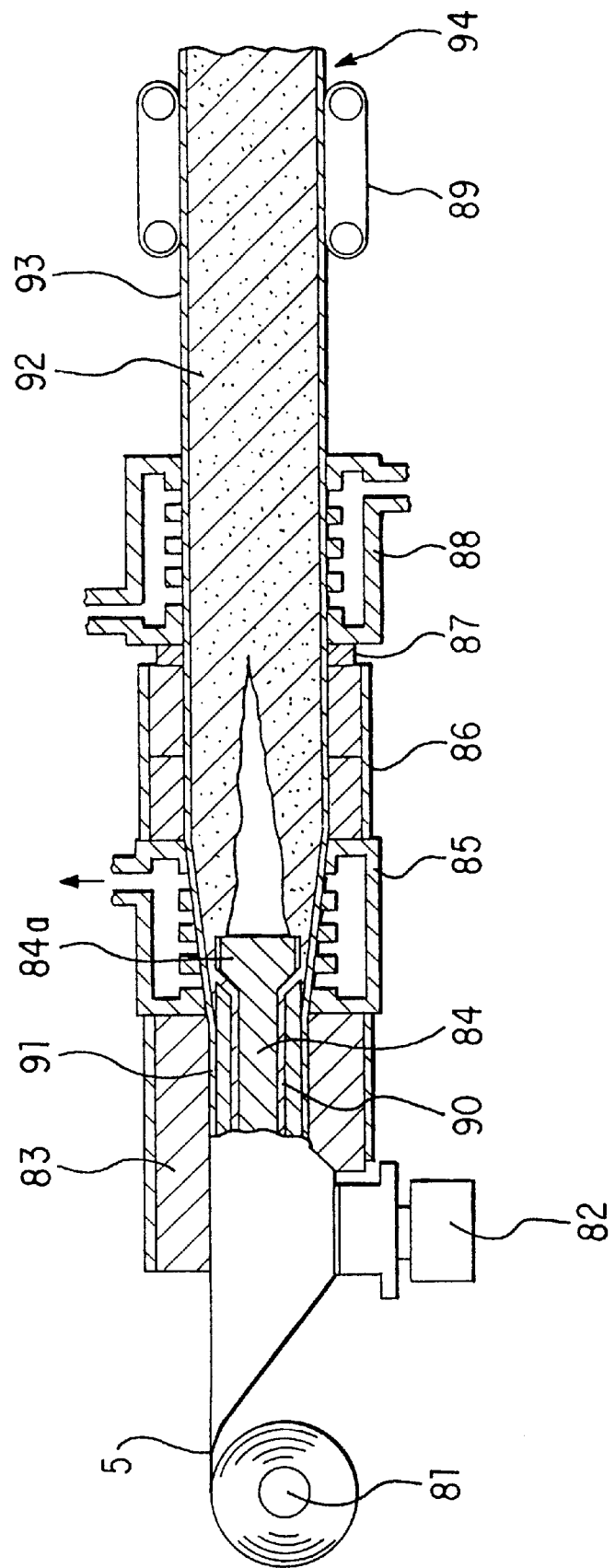
FIG. 10 is a sectional diagram of an apparatus for producing a fiber-reinforced thermoplastic resin foamed product used in Example 15.

The fiber-reinforced thermoplastic resin sheet 5 was wound by a winder in a coil form, and the wound resin sheet was transferred to an unwinding roll 81 of an apparatus for producing a fiber-reinforced thermoplastic resin foamed product as shown in FIG. 10. The apparatus for producing the fiber-reinforced thermoplastic resin foamed product comprises the unwinding roll 81; a shaping mold 83 connected to an extruder 82 for extruding a foamable resin composition at one side thereof and provided in front of the unwinding roll 81; an inner core 84 fixed to a rear portion of the shaping mold 83 to project forwardly therefrom and having a cross section of a circular shape; and a heat vacuum formation apparatus 85, a heating mold 86, a heat insulating material 87, a cooling mold 88 and a drawing machine 89 in front of the shaping mold 83 in this order from the rear side. The foamable resin composition comprises 100 parts by weight of chlorinated polyvinyl chloride, 2 parts by weight of dioctyl tin mercapto-type heat stabilizer, 2 parts by weight of a glycerin monostearate lubricant, 1 part by weight of polyethylene WAX, 5 parts by weight of polymethyl methacrylate processing aid, 5 parts by weight of $CaCO_3$ and 2.5 parts by weight of sodium bicarbonate (foaming temperature of 175° C.).

The shaping mold 83 includes a U-shaped inlet and a tubular outlet with a complete circular shape to make a path therebetween, wherein both ends of the fiber-reinforced thermoplastic resin sheet 5 inserted into the shaping mold 83 by transforming into a U-shape are gradually approached and finally abut against each other, so that a complete circular hollow member having an outer diameter of 29 mm and a thickness of 1.2 mm can be obtained. The extruder 82 is connected to the inner core 84 of the shaping mold 83 at a position just before the sheet 5 becomes a complete hollow member. The inner core 84 projects from a forward surface of the shaping mold 83. A path 90 for the foamable resin composition is formed between the inner core 84 and the shaping mold 83. The path 90 has an annular cross section, and opens in a trumpet form toward the inner circumferential surface of the vacuum forming apparatus 85 at a projecting portion 84a of the inner core 84.

The extruder 82 is a single-screw extruder having a diameter of 40 mm. The vacuum forming mold 85 has a circular inlet of the same diameter as an outer diameter of an outlet of the shaping mold 83, and a rectangular outlet of 18 mm×40 mm. An inner surface of the vacuum forming mold 85 is formed to gradually change from a circular shape to a rectangular shape from the inlet side toward the outlet side, and a circumferential length of the inner surface of the mold 85 is gradually increased. The inner surfaces of the heating mold 86 and cooling mold 88 coincide with the outlet shape of the vacuum forming apparatus. 85.

In the above apparatus, the fiber-reinforced thermoplastic resin sheet 5 unwound from the unwinding roll 81 was inserted into the shaping mold 83 by bending the sheet 5 into the U-shape, and continuously shaped into a hollow form while being heated in the mold 83 at a temperature of 170° C. to obtain a hollow member 91. The hollow member 91 was introduced into the vacuum forming apparatus 85 heated to 180° C., so that the hollow member 91 was sucked toward an inner surface of the vacuum forming apparatus 85 under a reduced pressure of 600 mmHg to shape into a predetermined form, while a foamable resin composition was extruded into an inner surface of the shaped article through the extruder 82 at a resin temperature of 190° C. to laminate thereon and at the same time to start forming. The shaped article was introduced into the heating mold 86 while foaming, and then the foaming was completed while holding the resin temperature at 180° C. The thus shaped article was cooled by the cooling mold 88 to 60° C. on its outer layer surface to thereby continuously obtain a fiber-reinforced thermoplastic resin foamed product 94 with a rectangular cross section of 18 mm×40 mm including a core layer 92 having an expansion ratio of 3.8 times and a surface layer 93. The formation speed was 1.0 m/min.

A bending strength, flexural modulus, compression strength, maximum and minimum values of a thickness of the surface layer 93 and CV value of the obtained fiber-reinforced thermoplastic resin foamed product 94 were measured in the same manner as in Example 2, and the results are shown in Table 1.

EXAMPLE 16

Except that a foamable resin composition prepared by supplying to a twin-screw extruder of a diameter of 30 mm and melt kneading at a temperature of 170° C., a mixture comprising 100 parts by weight of high density polyethylene, 100 parts by weight of homopolypropylene, 40 parts by weight of cross-linking silane modified polypropylene and 5 parts by weight of azodicarbonamide (foaming temperature of 190° C.), to thereby form a sheet of a width of 80 mm and a thickness of 3 mm, soaking the sheet in hot water of 100° C. for one hour and then drying, was used; the foamable resin composition was extruded through the extruder 82 at a resin temperature of 170° C. in an unfoamed state; and the heating mold 86 was held at 220° C. to thereby foam the foamable resin composition, a fiber-reinforced thermoplastic resin foamed product 94' with a rectangular cross section of 18 mm×40 mm including a core layer 92' of an expansion ratio of 3.2 times and a surface layer 93' was continuously obtained in the same manner as in Example 15.

A bending strength, frexural modulus, compression strength, maximum and minimum values of a thickness of the surface layer 93' and VC value of the obtained fiber-reinforced thermoplastic resin foamed product 94' were measured in the same manner as in Example 2, and the results are shown in Table 1.

EXAMPLE 17

A fiber-reinforced thermoplastic resin sheet 5 having a thickness of 1 mm, a width of 91 mm and a glass fiber content of 40% by volume was obtained in the same manner as in Example 15, except that polypropylene (melt viscosity 1.2×10 poise) was used as a powder-form resin composition and a temperature of a heating furnace 4 was 210° C.

Further, a foamable resin composition comprising 100 parts by weight of high density polyethylene, 15 parts by weight of cross-linking silane modified polypropylene, 5 parts by weight of azodicarbonamide (foaming temperature of 190° C.) and 10 parts by weight of glass fibers (filament diameter of 14 micro meters, fiber length of 5 mm) was extruded through a twin-screw extruder of a diameter of 30 mm while maintaining the resin temperature at 170° C. or lower to thereby obtain a foamable resin composition sheet with a thickness of 1 mm. The foamable resin composition sheet and the above-obtained fiber-reinforced thermoplastic resin sheet 5 were laminated with each other to fuse-bond at a temperature of 170° C., so that a composite sheet 99 of a width of 110 mm including a foamable thermoplastic resin layer of 1 mm in thickness and a fiber-reinforced thermoplastic resin layer of 1 mm in thickness was obtained. The composite sheet 99 had one end where the foaming thermoplastic resin sheet was not laminated in a length of 10 mm.

Figure 11:
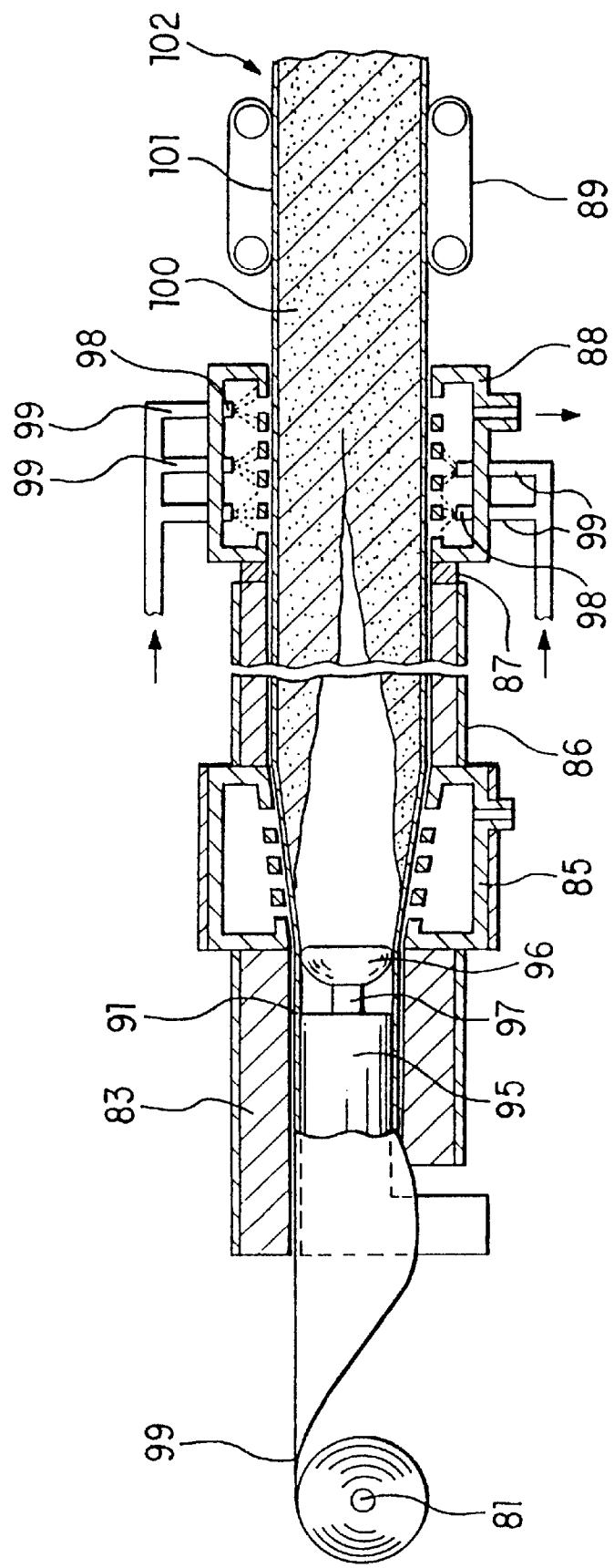
FIG. 11 is a sectional diagram of an apparatus for producing a fiber-reinforced thermoplastic resin foamed product used in Example 17.

The composite sheet 99 was wound by a winder in a coil form in the same manner as in Example 15, and the wound composite sheet was transferred to an unwinding roll 81 for an apparatus for producing a fiber-reinforced thermoplastic resin foamed product as shown in FIG. 11.

An apparatus for producing the fiber-reinforced thermoplastic resin foamed product has the same structure as that of FIG. 10, except that the apparatus, when compared with the apparatus of FIG. 10, does not have an extruder; an inner core 95 does not project forwardly from a shaping mold 83; a pressing head portion 96 made of silicone, which pushes a hollow member 91 against an inner surface of a shaping mold 83 just before the hollow member 91 is introduced into a vacuum forming apparatus 85 is provided at the forward end of an inner core 95 through a neck portion 97; and cooling water spraying nozzles 98 are provided in a cooling mold 88. For a cooling water supplying manifold 99 connected to the cooling water spraying nozzles 98, a piping for a vacuum drawing is used. In the apparatus shown in FIG. 11, the same reference symbols are assigned for the same parts and portions as those of the apparatus shown in FIG. 10, and the explanations thereof are omitted.

In the above apparatus, the composite sheet 99 unwound from the unwinding roll 81 was bent in a U-shape such that the foamable thermoplastic resin layer is located inside thereof, and inserted into the shaping mold 83. The sheet 99 was continuously shaped into a hollow form in the shaping mold 83 heated to a temperature of 170° C. to thereby obtain a hollow member 91 of an outer diameter of 29.0 mm and a thickness of 2 mm. The obtained hollow member 91 was introduced into a vacuum forming apparatus 85 heated to 220° C., and sucked against an inner surface of the vacuum forming apparatus 85 under a reduced pressure of 700 mmHg to thereby shape and at the same time to start foaming the foamable thermoplastic resin layer provided inside thereof. Then, the hollow member 91 was introduced into a heating mold 86 while foaming, and the resin temperature was held at 210° C. to complete the foaming. Thereafter, the hollow member 91 was cooled in a cooling mold 88 to 40° C. on an outer layer surface to thereby continuously obtain a fiber-reinforced thermoplastic resin foamed product 102 with a rectangular cross section of 30 mm×30 mm at a formation speed of 1.5 m/min and having a core layer 100 of an expansion ratio of 4 times and a surface layer 101.

A bending strength, flexural modulus, compression strength, maximum and minimum values of a thickness of the surface layer and CV value of the obtained fiber-reinforced thermoplastic resin foamed product were measured in the same manner as in Example 2, and the results are shown in Table 1.

EXAMPLE 18

Except that an air hole was provided at the center of an inner core 95 from a rear side thereof instead of the pushing head portion 96; air was supplied to an interior of the forward portion of a shaping mold 83 through the air hole to thereby generate an inner pressure of 0.2 kg/cm², so that a hollow member 91 was pressed against an inner surface of the shaping mold 83; then the hollow member 91 was introduced into a vacuum forming apparatus 85, so that the hollow member 91 was formed into a rectangular hollow member of 30 mm×30 mm under a reduced pressure of 550 mmHg; and the formation speed was 1.2 m/min, a fiber-reinforced thermoplastic resin foamed product having a core layer of an expansion ratio of 3.5 times was obtained in the same manner as in Example 17.

A bending strength, flexural modulus, compression strength, maximum and minimum values of a thickness of the surface layer and CV value of the obtained fiber-reinforced thermoplastic resin foamed product were measured in the same manner as in Example 2, and the results are shown in Table 1.

EXAMPLE 19

A fiber-reinforced thermoplastic resin sheet was produced in the same manner as in Example 15, except that high density polyethylene (melt viscosity of 1.4×10⁵ poise) was used as a powder-form resin composition, and an obtained fiber-reinforced thermoplastic resin sheet was adjusted to have a thickness of 0.5 mm.

A glass fiber content in the fiber-reinforced thermoplastic resin sheet was 40% by volume.

Figure 12:
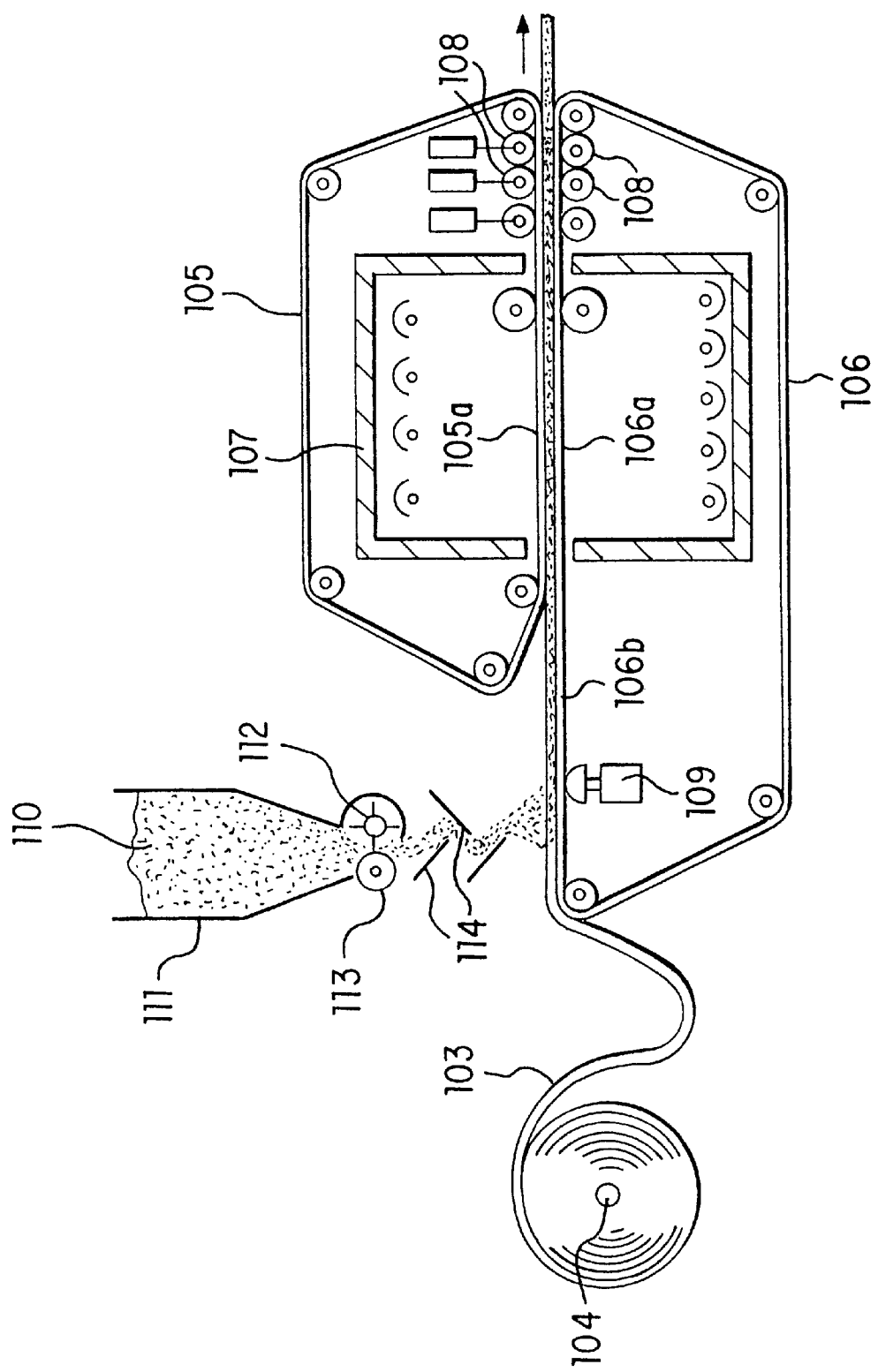
FIG. 12 is a sectional diagram of an apparatus for producing a composite foamable sheet used in Example 19.

While the fiber-reinforced thermoplastic resin sheet was integrated with a composite foaming sheet as explained later, the composite foaming sheet was produced by an apparatus as shown in FIG. 12.

The apparatus shown in FIG. 12 comprises an unwinding roll 104, around which a glass matte 103 was wound; upper and lower endless belts 105, 106 located in front of the unwinding roll 104 and continuously moved; a heating furnace 107 held at 180° C. and provided so that sandwiching portions 105a, 106a of the upper and lower endless belts 105, 106 disposed opposite to each other to have a space therebetween can pass in the furnace 107; a plurality of pairs of upper and lower pressing rolls 108 for pressing the sandwiching portions 105a, 106a and provided in front of the heating furnaces 107; a vibrator 109 provided under the upper side transferring portion 106b projecting rearwardly of the lower endless belt 106 and for vibrating thereof; a supplying hopper 111 disposed at an upper portion of the transferring portion 106b and for supplying a powder 110; an impeller 112 disposed near a discharging port of the hopper 111 for regulating a supply quantity of the powder 110 to a certain value; a roller 113 disposed to face the impeller 112 with a certain space from the vanes of the impeller 112; and a plurality of inclined plates 114 disposed between the hopper 111 and the transferring portion 106b to be inclined downwardly along a falling line of the powder 110 so that forward ends of the inclined plates overlap each other with a space therebetween. The above powder 110 was obtained by kneading a foamable resin composition comprising 100 parts by weight of high density polyethylene, 15 parts by weight of cross-linking silane modified polypropylene, and 4 parts by weight of azodicarbonamide (foaming temperature of 190° C.), by using a twin-screw extruder with a diameter of 30 mm at a resin temperature of 175° C., pelletizing, soaking in hot water of 100° C. for one hour and subjecting to refrigeration pulverization to thereby obtain a powder with a particle diameter of 100 micro meters or smaller.

A composition of the used glass mat was a mixture of 100 parts by weight of glass fibers (fiber diameter of 7–17 micro meters, fiber length of 50–100 mm) and 50 parts by weight of organic fibers (polyethylene, fiber diameter of 30 micro meters, fiber length of 50 mm). The glass mat was formed under the conditions that the weight per area was 680–700 g/cm$_2$; the needle specification was a needle, #32 (product of Organ Needle Co., Ltd.); punch density was 60 to 70 spots/cm$_2$; and punch depth was 9–10 mm. The weight of the foamable resin composition in the obtained composite foamable sheet was 40% by weight.

Figure 13:
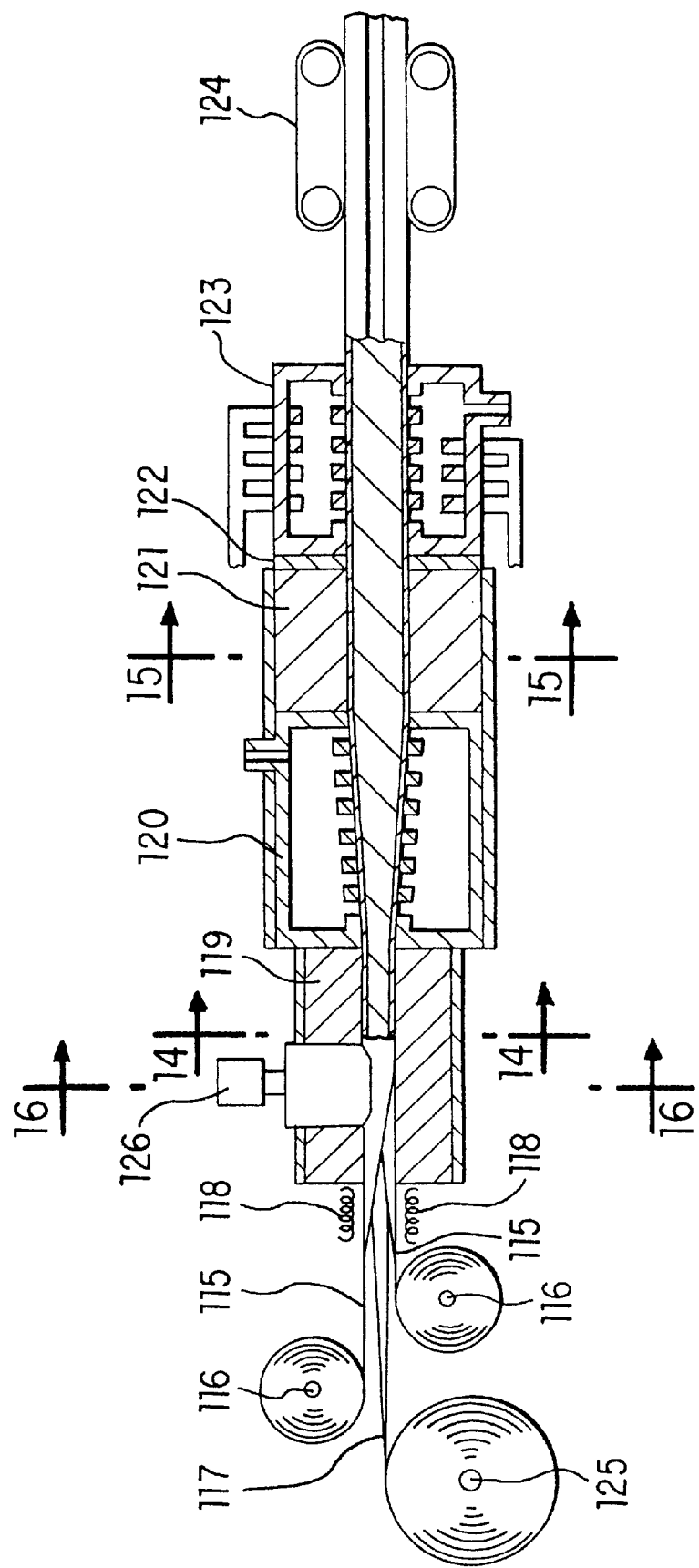
FIG. 13 is a sectional diagram of an apparatus for producing a fiber-reinforced thermoplastic resin foamed product used in Example 19.
Figure 14:
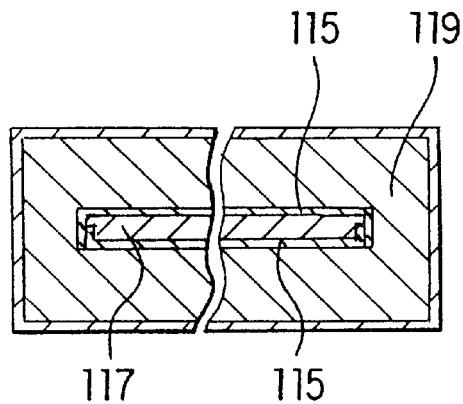
FIG. 14 is a section view of a heating mold taken along a line 14—14 in FIG. 13.
Figure 15:
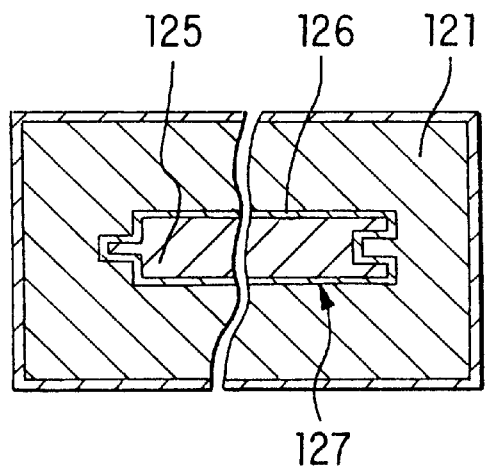
FIG. 15 is a section view of the heating mold taken along a line 15—15 in FIG. 13.
Figure 16:
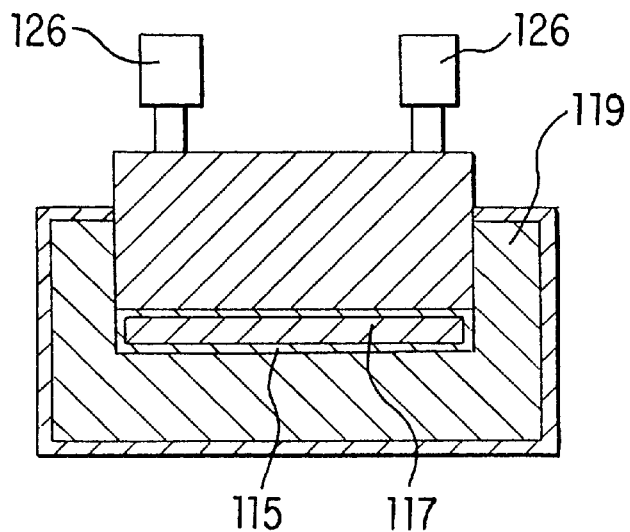
FIG. 16 is a section view taken along a line 16—16 in FIG. 13.

In Example 19, a fiber-reinforced thermoplastic resin foamed product was produced by an apparatus shown in FIG. 13.

The apparatus shown in FIG. 13 comprises upper and lower unwinding rolls 116 where the fiber-reinforced thermoplastic resin sheets 115 with a thickness of 0.5 mm and a width of 458 mm are wound; an unwinding roll 125 where the composite foamable sheet 117 with a thickness of 4 mm and a width of 445 mm is wound and disposed in the rear side of the lower unwinding roll 116; upper and lower far-infrared ray heaters 118 provided in front of the upper and lower unwinding rolls 116; and a heating mold 119, a heating vacuum forming apparatus 120, a heating mold 121, a heat insulating material 122, a cooling mold 123 and a drawing machine 124, which are located in front of the heaters 118 in this order.

In the backward of the heating mold 119, though not shown, shaping plates for bending both side portions of the upper and lower fiber-reinforced thermoplastic resin sheets 115 into an L-shape to face to each other were provided. While both the fiber-reinforced thermoplastic resin sheets 115 were overlapped in both end portions with an overlapped portion of 4 mm along the shaping plates, the sheets 115 with the composite foamable sheet 117 sandwiched therebetween were introduced into the heating mold 119. These sheets were integrated by applying to the sheets 115 and 117 a certain pressure (1 kg/cm$_2$) through an air cylinder 126 having a cylinder with a width of 450 mm and a length of 50 mm as shown in the drawing. By previously heating both fiber-reinforced thermoplastic resin sheets 115 to 100° C. by the far-infrared ray heaters 118 before introduction into the heating mold 119, the introduction into the heating mold 119 was readily performed. The heating mold 119 was regulated to 210° C. The plate-form hollow member containing the composite foamable sheet was introduced into the heating vacuum forming apparatus 120 while regulating a speed so that the foamable thermoplastic resin composition started foaming at the forward end of the heating mold 119, and the plate-form hollow member was thickened from 5 mm to 12 mm by reducing pressure under vacuum pressure of 650 mmHg, so that the foaming was completed in the heating mold 121. Then, the member was slid into the cooling mold 123 while closely contacting in its surface with an inner surface of the cooling mold 123 under a reduced pressure of 720 mmHg to thereby cool the surface temperature to 50° C. Thus, a plate-form fiber-reinforced thermoplastic resin foamed product 127 including a core layer 125 of an expansion ratio of 2.9 times and a surface layer 126, and having a thickness of 12 mm and a width of 450 mm, was obtained. The formation speed was 80 cm/min.

A bending strength, flexural modulus, compression strength, maximum and minimum values of a thickness of the surface layer and CV value of the obtained fiber-reinforced thermoplastic resin foamed product were measured in the same manner as in Example 2, and the results are shown in Table 1.

EXAMPLE 20

Except that three sheets of the fiber-reinforced thermoplastic resin sheets 8$a$ with a thickness of 0.6 mm and a width of 60 mm were used; when the three sheets were inserted into a shaping mold 83$a$ as shown in FIG. 17, about halves of the respective sheets were overlapped with each other; an inner core 84 at the center thereof was provided with an air hole extending forward, so that air was supplied to an interior of the hollow member passing through the heating vacuum forming apparatus 85 through the air hole to thereby generate an inner pressure of 0.3 kg/cm$^2$, and at the same time, a pressure was reduced to 400 mmHg in the heating vacuum forming apparatus 85, to thereby form the circular hollow member into a rectangular hollow member of 18 mm×40 mm; and the formation speed was 1.2 m/min., a fiber-reinforced thermoplastic resin foamed product with an expansion ratio of 4.7 times in the core layer was obtained in the same manner as in Example 15.

A bending strength, flexural modulus, compression strength, maximum and minimum values of a thickness of the surface layer and CV value of the obtained fiber-reinforced thermoplastic resin foamed product were measured in the same manner as in Example 2, and the results are shown in Table 1.

EXAMPLE 21

Except that three sheets of the fiber-reinforced thermoplastic resin sheets 8$a$ with a width of 60 mm were used; when the three sheets were inserted into a shaping mold 83$a$ as shown in FIG. 17, about halves of the respective sheets were overlapped with each other; an inner core 84 was provided at the center thereof with an air hole extending forwardly, so that air was supplied to an interior of the hollow member passing through the heating vacuum forming apparatus 85 from the air hole to thereby generate an inner pressure of 0.3 kg/cm$^2$, and at the same time, the pressure was reduced to 400 mmHg in the heating vacuum forming apparatus 85 to thereby form the circular hollow member to a rectangular hollow member with 18 mm×40 mm; and the formation speed was 1.2 m/min, a fiber-reinforced thermoplastic resin foamed product of an expansion ratio of 4.7 times in the core layer was obtained in the same manner as in Example 16.

A bending strength, flexural modulus, compression strength, maximum and minimum values of a thickness of the surface layer and CV value of the obtained fiber-reinforced thermoplastic resin foamed product were measured in the same manner as in Example 2, and the results are shown in Table 1.

EXAMPLE 22

The composite sheet used in Example 12 was employed.

Figure 21:
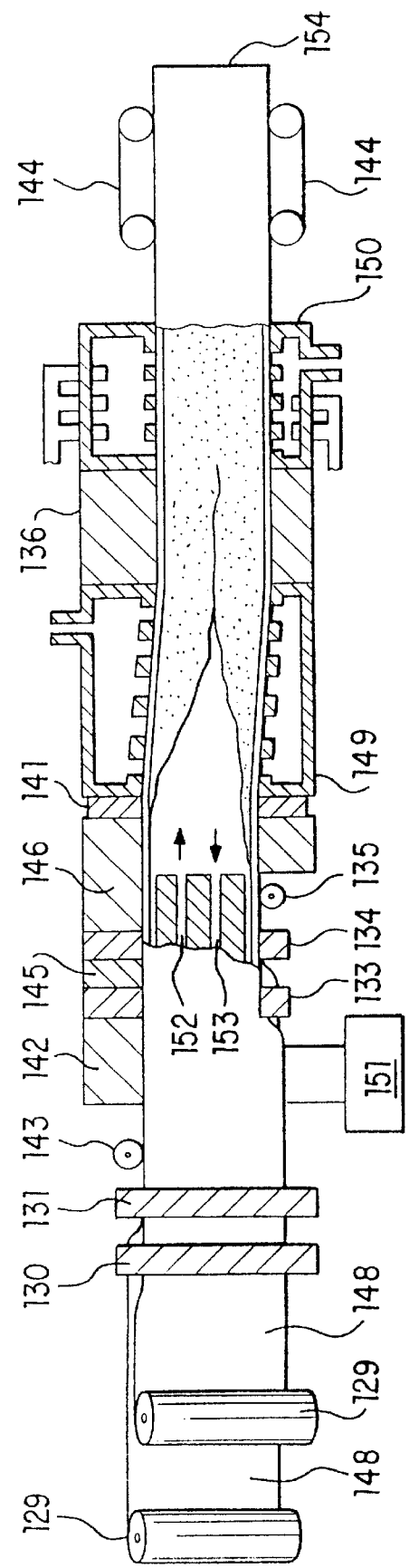
FIG. 21 is a sectional diagram of an apparatus for producing a fiber-reinforced thermoplastic resin foamed product used in Example 22.

A fiber-reinforced thermoplastic resin foamed product was obtained by using a production apparatus shown in FIG. 21.

The same reference symbols are assigned for the same parts and portions as those of the apparatus shown in FIG. 18, and the explanations thereof are omitted.

Except that a hot air intaking/exhausting device 151 including a hot air intake port 152 and a hot air exhaust hole 153 was used instead of the extruder 132; a heating vacuum forming machine 149 was provided between the heat insulating material 141 and the heating mold 136; the heating vacuum forming machine 149 had a shape of a rectangular cross section with a width 12×thickness 90 mm at an inlet port thereof and a cross section as shown in FIG. 18-5 at an outlet port, the shape gradually changing therebetween; a vacuum cooling mold 150 was used instead of the cooling mold 138; and the heating mold 136 and the vacuum cooling mold 150 had cross sections corresponding to the outlet shape of the heating vacuum formation machine 149, the same apparatus for producing a fiber-reinforcing thermoplastic resin foamed product as that used in Example 10 was used in the present example. Except that the composite sheet 148 used in Example 12 was used instead of the fiber-reinforced thermoplastic resin sheet 128; hot air at a temperature of 210° C. was supplied into an inner surface of the hollow member through the hot air intake port and at the same time exhausted through the hot air exhaust hole 153; the temperature of the molds 145, 146 was held at 210° C.; the hollow member was shaped under a pressure of 650 mmHg by the heating vacuum forming machine 149 held at a temperature of 200° C.; a temperature of the heating mold was 200° C.; and the hollow member was drawn under a pressure of 720 mmHg in the vacuum cooling mold 150 to thereby cool the surface layer to 40° C., a fiber-reinforced thermoplastic resin foamed product 154 was obtained in the same manner as in Example 10.

A bending strength, flexural modulus, compression strength, maximum and minimum values of a thickness of the surface layer and CV value of the obtained fiber-reinforced thermoplastic resin foamed product 154 were measured in the same manner as in Example 2, and the results are shown in Table 1.

EXAMPLE 23

A fiber-reinforced thermoplastic resin foamed product having a core layer of an expansion ratio of 2.5 times was obtained in the same manner as in Example 19, except that a fiber-reinforced thermoplastic resin sheet with a width of 200 mm was shaped into a hollow member.

A bending strength, flexural modulus, compression strength, maximum and minimum values of a thickness of the surface layer and CV value of the obtained fiber-reinforced thermoplastic resin foamed product 102 were measured in the same manner as in Example 2, and the results are shown in Table 1.

COMPARATIVE EXAMPLE 1

Figure 8:
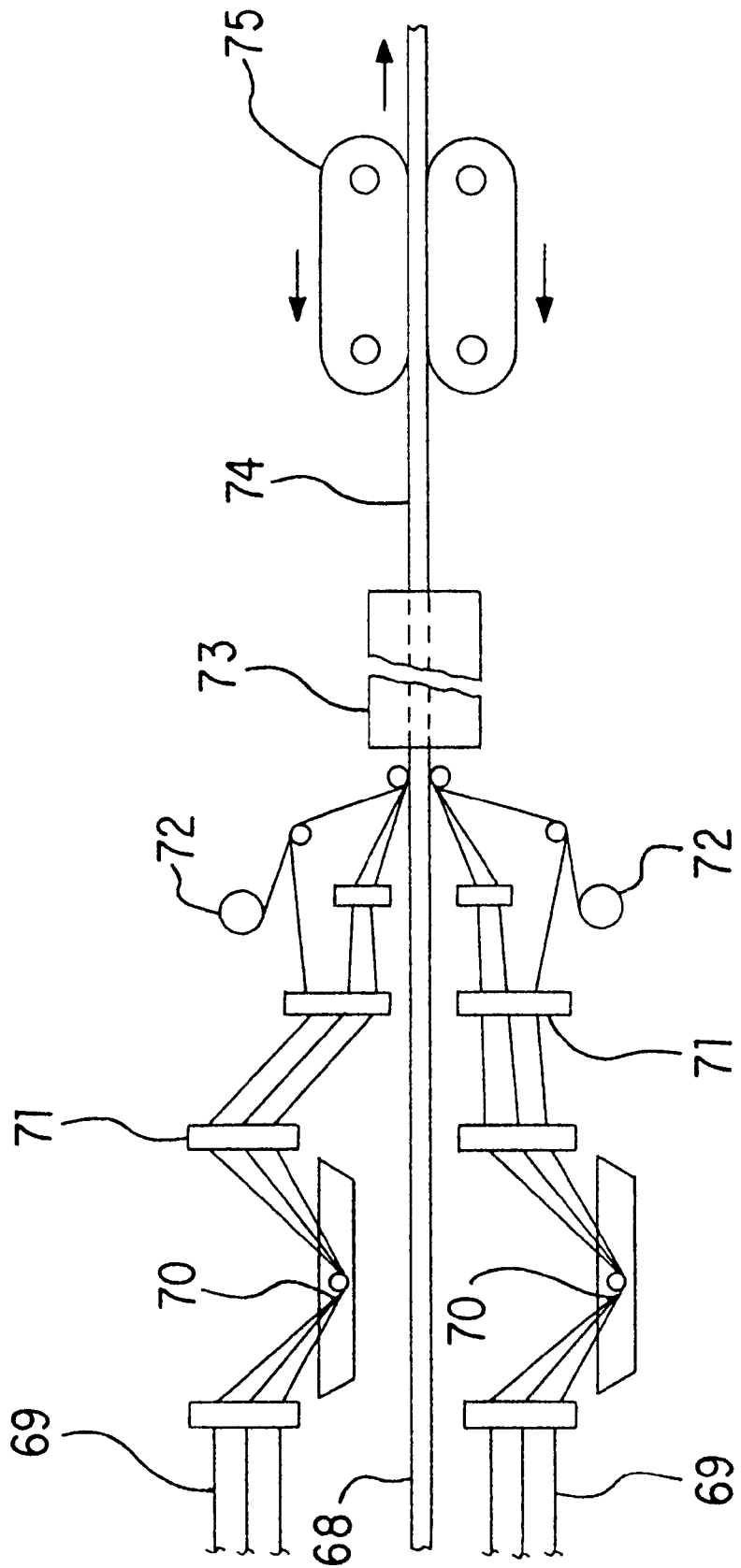
FIG. 8 is a sectional diagram of an apparatus for producing a composite used in Comparative Example 1.

A composite was produced by using a production apparatus as shown in FIG. 8. A foamed member obtained by extruding the foamable resin composition used in Example 1 and having an expansion ratio of 3.5 times, an outer diameter of 26 mm and a length of 4000 mm was used as a core material 68. In the drawing, reference numeral 69 represents roving-form glass fiber bundles (4400 tex) formed of filaments with a diameter of 23 micro meters, and the fiber bundles 69 were passed through resin liquid tanks 70 filled with a liquid thermosetting resin (unsaturated polyester), transferred through a plurality of aligning devices 71, and guided toward outer surfaces of the core material 68 from the upper and lower directions of the core material 68 heated to a temperature of 170° C. and softened. On one hand, unwoven cloths (continuous mat of glass fiber) 72 were applied onto the outer surfaces of the reinforced fibers 69, and fed into a draw-formation mold 73 having a circular cross section with an inner diameter of 29 mm. Then, the molding materials were heat-cured at a temperature of 180° C. in the formation mold 73 to thereby obtain a composite 74, and the composite 74 was taken up by a drawing machine 75.

A bending strength, flexural modulus, compression strength, maximum and minimum values of a thickness of the surface layer and CV value of the obtained composite 74 were measured in the same manner as in Example 1, and the results are shown in Table 1.

COMPARATIVE EXAMPLE 2

A sheet obtained by laminating a polyvinyl chloride sheet having a thickness of 0.3 mm onto the fibrous sheet used in Example 6 and melting between pressure rolls heated to 200° C. was used. A glass fiber content of the obtained glass fiber-reinforced polyvinyl chloride sheet was 42% by volume, and a thickness of the sheet was 1.2 mm.

Figure 9:
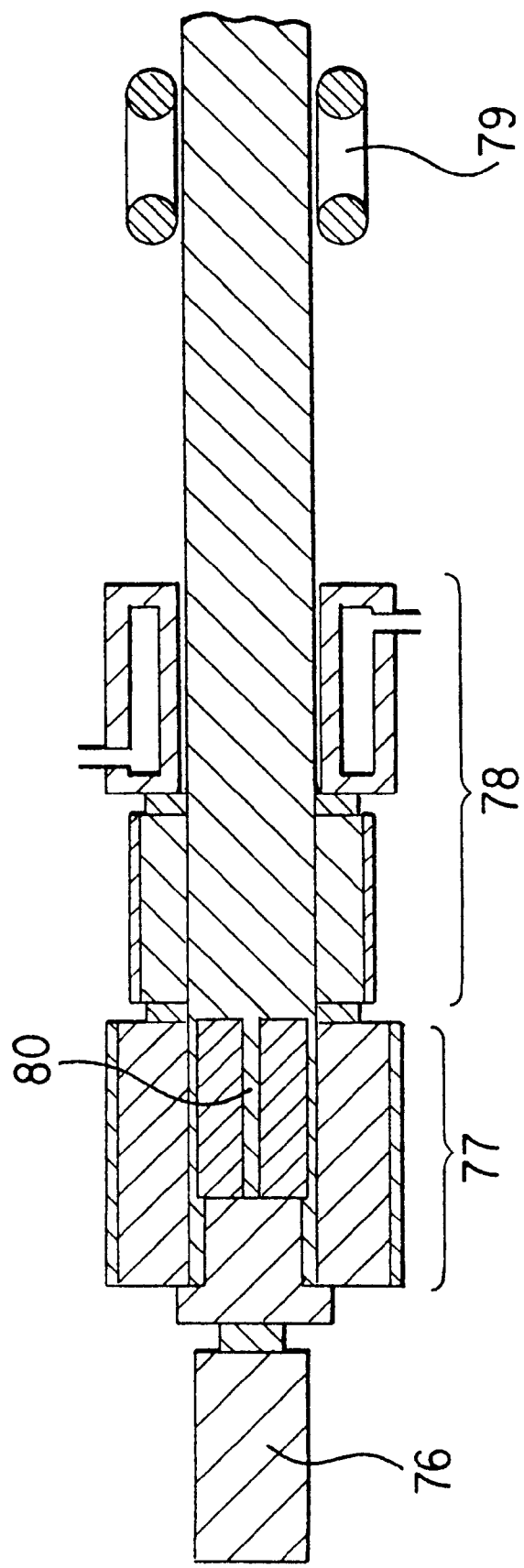
FIG. 9 is a sectional diagram of an apparatus for producing a fiber-reinforced thermoplastic resin foamed product used in Comparative Example 2.

An apparatus shown in FIG. 9 was used to produce a foamed product.

The apparatus comprises a foamable resin composition extruder 76, a foaming resin composition extruding mold 77, a heating and cooling mold 78 and a drawing machine 79. The foaming resin composition extruding mold 77 was provided with a flowing path 80 with a diameter of 5 mm extending from the extruder 76, so that a foaming resin composition is extruded through the path 80. The mold 77 was fixed to the heating and cooling mold 78 having an inner surface of a circular cross section with a diameter of 27.5 mm.

The foaming resin composition used in Example 6 was extruded, while foaming, through the foaming resin composition extruding mold 77, heated at a heating portion of the heating and cooling mold 78 to complete foaming, and cool-solidified at a cooling portion of the heating and cooling mold 78. A polyvinyl chloride foamed member of a foaming magnification rate of 3.0 times was produced.

The obtained foamed member had a circular cross section with a diameter of 27.5 mm. A composite foamed product including a foamed member layer and a fiber-reinforced polyvinyl chloride layer was obtained by sticking the above obtained glass fiber reinforced polyvinyl chloride sheet onto an outer side of the foamed member by a vinyl acetate adhesive in an emulsion state.

A bending strength, flexural modulus, compression strength, maximum and minimum values of a thickness of the surface layer and CV value of the obtained composite foamed product were measured in the same manner as in Example 1, and the results are shown in Table 1. When the bending strength of the composite foamed product was measured, the fiber-reinforced polyvinyl chloride layer and the foamed member layer were separated.

COMPARATIVE EXAMPLE 3

In the production apparatus used in Example 1, except that a fiber-reinforced thermoplastic resin sheet was not supplied; a cooling mold was used where a cross section of an inlet port was the same shape as that of the heating mold 11 and a cross section of an outlet port was a rectangle with 30 mm×30 mm, while change gradually from the inlet port toward the outlet port; and a product was cooled quickly at 25° C., the foamed product was prepared in the same manner as in Example 1.

The obtained foamed product had an unfoamed layer with a thickness of 1 mm on a surface thereof.

A bending strength, flexural modulus, compression strength, maximum and minimum values of a thickness of the surface layer and CV value of the obtained foamed product were measured in the same manner as in Example 2, and the results are shown in Tale 1.

TABLE 1

|  | Minimum (mm) | Maximum (mm) | CV Value (%) | Bending Strength (Kg/mm$^2$) | Flexural Modulus (Kg/mm$^2$) | Compression Strength (Kg/cm$^2$) |
| --- | --- | --- | --- | --- | --- | --- |
| Ex. 1 | 1.16 | 1.25 | 3.8 | 3.2 | 800 | 42 |
| Ex. 2 | 1.15 | 1.42 | 6.5 | 3.9 | 920 | 78 |
| Ex. 3 | 1.22 | 1.53 | 8.7 | 3.5 | 750 | 70 |
| Ex. 4 | 0.75 | 1.24 | 9.1 | 2.6 | 730 | 63 |
| Ex. 5 | 0.93 | 1.18 | 7.6 | 2.3 | 660 | 45 |
| Ex. 6 | 1.09 | 1.36 | 7.9 | 2.7 | 710 | 30 |
| Ex. 7 | 1.26 | 1.55 | 9.4 | 3.4 | 820 | 28 |
| Ex. 8 | 1.03 | 1.27 | 7.2 | 2.9 | 780 | 46 |
| Ex. 9 | 1.39 | 1.63 | 11.3 | 3.6 | 840 | 42 |
| Ex. 10 | 1.09 | 1.44 | 12.8 | 3.5 | 860 | 89 |
| Ex. 11 | 1.02 | 1.38 | 11.9 | 2.9 | 790 | 80 |
| Ex. 12 | 1.03 | 1.29 | 9.1 | 2.7 | 750 | 83 |
| Ex. 13 | 1.05 | 1.32 | 9.3 | 3.2 | 760 | 75 |
| Ex. 14 | 1.00 | 1.28 | 9.5 | 3.0 | 750 | 70 |
| Ex. 15 | 1.40 | 1.12 | 6.5 | 3.4 | 710 | 52 |
| Ex. 16 | 1.34 | 1.12 | 6.2 | 2.9 | 700 | 55 |
| Ex. 17 | 1.15 | 0.89 | 6.1 | 2.9 | 680 | 30 |
| Ex. 18 | 1.20 | 0.88 | 6.3 | 2.2 | 690 | 59 |
| Ex. 19 | 0.53 | 0.32 | 5.4 | 6.5 | 860 | 220 |
| Ex. 20 | 1.32 | 1.09 | 7.1 | 3.7 | 680 | 21 |
| Ex. 21 | 1.14 | 1.30 | 4.1 | 3.2 | 730 | 26 |
| Ex. 22 | 1.18 | 1.35 | 4.6 | 3.2 | 720 | 32 |
| Ex. 23 | 1.26 | 0.45 | 36.2 | 1.5 | 460 | 61 |
| Com. Ex. 1 | 0.78 | 2.13 | 35.6 | 2.8 | 640 | 60 |
| Com. Ex. 2 | 1.12 | 1.24 | 4.3 | 2.5 | 690 | 38 |
| Com. Ex. 3 | — | — | — | 2.4 | 120 | 54 |

The invention is constructed as described above, and there is no necessity to previously prepare a foamed member to thereby obtain excellent productivity. Further, since a hollow member is shaped by a foaming pressure, uneven thickness on the surface layer of the hollow member hardly occurs, and a fiber-reinforced thermoplastic resin foamed product with uniform quality, such as rigidity, can be obtained.

Since a thermoplastic resin is used as the surface and core layers and shaping is carried out by the foaming pressure, it is possible to form the resin into a desired shape in the production process, so that a fiber-reinforced thermoplastic resin foamed product having a complicated cross section can be obtained. Also, since the resin used in the invention is a thermoplastic resin, it can be re-formed and recycled.

Further, the resin in the molten state while foaming pushes from the inside of the hollow member by the foaming pressure of the foamable resin composition, so that the surface layer and the core layer are integrally fuse-bonded together. Thus, there is no partial weak portion in fuse-bonding in an interface between the surface layer and the core layer, so that a fiber-reinforced thermoplastic resin foamed product having uniform rigidity, such as bending strength, can be obtained.

Also, by using a composite sheet, an interface between the surface layer and the core layer contains gas generated from the foaming resin composition to thereby prevent voids from being formed in the interface between the surface layer and the core layer of the obtained fiber-reinforced thermoplastic resin foamed product.

Further, by using a fibrous sheet, a foaming resin composition is foamed to thereby permeate the resin into the fibers of the fibrous sheet. Therefore, it is not necessary to previously prepare a fiber-reinforced thermoplastic resin sheet to thereby omit the preparation process.

According to one mode of the invention, since a hollow member is shaped by a foaming pressure in addition to vacuum forming and/or air pressure forming, a fiber-reinforced thermoplastic resin foamed product having a more complicated cross sectional shape can be obtained with accuracy, when compared with a case where only the foaming pressure is used.

When a fiber-reinforced thermoplastic resin sheet where many continuous fibers are oriented is used, and a hollow member is shaped so that the continuous fibers are arranged in a longitudinal direction, a fiber-reinforced thermoplastic resin foamed product can be produced while drawing out the hollow member thus to improve the productivity.

According to another mode of the invention, when a foamable fiber-reinforced thermoplastic resin composition is heat-foamed and at the same time subjected to an air pressure formation, a thickness thereof is extended. Thus, the reinforced fibers of a matte shaped article are elongated substantially toward a thickness direction, so that a fiber-reinforced thermoplastic resin foamed product having excellent compression strength can be obtained.

What is claimed is:

1. A method of producing a fiber-reinforced thermoplastic resin foamed product, comprising:
    preparing at least one fiber-reinforced thermoplastic resin sheet formed of a thermoplastic resin and continuous fibers arranged in a longitudinal direction, wherein said continuous fibers are united together by the thermoplastic resin, shaping said at least one fiber-reinforced thermoplastic resin sheet continuously to form a hollow member,
    entering said hollow member continuously into a heated mold having a shape gradually changing from a first cross sectional inlet shape to a second cross sectional outlet shape,
    supplying a foamable resin composition containing a thermoplastic resin in a molten state and a foaming agent to inside of the hollow member, and
    foaming said foamable resin composition while the hollow member passes through the heated mold to unite the thermoplastic resin of the foamable resin composition and the hollow member and to shape the hollow member in said second cross sectional shape, which is different from the first cross sectional shape, by a foaming pressure of the foamable resin composition against the mold.

2. A method according to claim 1, wherein said foamable resin composition is supplied to the inside of the hollow member while the foamable resin composition is foaming.

3. A method according to claim 2, further comprising shaping the hollow member to the second cross sectional shape by applying to the hollow member at least one of a vacuum pressure and pressurized gas.

4. A method according to claim 1, wherein said foamable resin composition is supplied to the mold while the foaming agent is foaming, the hollow member being drawn from the mold while the foamable resin composition is forming to thereby shape the hollow member.

5. A method according to claim 1, wherein said fiber-reinforced thermoplastic resin sheet contains a resin selected from a group consisting of polyvinyl chloride, polypropylene and polyethylene.

6. A method according to claim 1, wherein after the foamable resin composition is supplied to the inside of the hollow member, the foamable resin composition is heated to a temperature more than a foaming temperature to thereby initiate foaming of the foamable resin composition.

7. A method according to claim 6, further comprising shaping the hollow member to the second cross sectional shape by applying to the hollow member at least one of a vacuum pressure and pressurized gas.

8. A method according to claim 6, wherein said foamable resin composition is supplied to the hollow member while the hollow member is in the mold, the hollow member being drawn from the mold while the foamable resin composition is forming to thereby shape the hollow member.

9. A method according to claim 1, wherein said fiber-reinforced thermoplastic resin sheet is a fibrous sheet in which fibers are piled in a sheet form and bound with a binding agent, and said foamable resin composition is supplied to the inside of the hollow member while the foamable resin composition is foaming.

10. A method according to claim 1, wherein said fiber-reinforced thermoplastic resin sheet is a fibrous sheet in which fibers are piled in a sheet form and bound with a binding agent, and after the foamable resin composition is supplied to the inside of the hollow member, the foamable resin composition is heated to a temperature more than a foaming temperature to thereby initiate foaming of the foamable resin composition.

11. A method according to claim 1, wherein an expansion ratio of the foamable resin composition for constituting a core layer is in a range of 1.5 to 5 times.

12. A method according to claim 1, wherein said foaming agent is selected from a group consisting azodicarbonamide and sodium bicarbonate.

13. A method according to claim 1, wherein said foamable resin composition contains at least one resin selected from a group consisting of polyvinyl chloride, chlorinated polyvinyl chloride and polyethylene.

14. A method according to claim 1, further comprising entering said hollow member with a foamed resin composition therein into a cooling mold situated adjacent to the heated mold to cool and fix a shape of the hollow member.

15. A method of producing a fiber-reinforced thermoplastic resin foamed product, comprising:

preparing at least one composite resin sheet formed of a fiber-reinforced thermoplastic resin layer and a foamable resin composition layer containing a thermoplastic resin and a foaming agent, shaping said at least one composite resin sheet continuously to form a hollow member with a first cross sectional shape so that the fiber reinforced thermoplastic resin layer forms an outer layer, shaping the hollow member by applying to the hollow member at least one of a vacuum pressure and pressurized gas in a heated mold while foaming said foaming agent in the foamable resin composition layer to thereby shape the hollow member including the thermoplastic resin layer in a second cross sectional shape different from the first cross sectional shape, said foamable resin composition layer, when the foaming agent is being foamed, being in a molten state and integrally bonded to the fiber reinforced thermoplastic resin layer, wherein said inlet of said heated mold has said first shape and said outlet of said heated mold has said second shape.

16. A method according to claim 15, wherein an expansion ratio of the foamable resin composition for constituting a core layer is in a range of 1.5 to 5 times, said fiber-reinforced thermoplastic resin layer containing a thermoplastic resin and continuous fibers arranged in a longitudinal direction and united together by the thermoplastic resin.

17. A method of producing a fiber-reinforced thermoplastic resin foamed product, comprising:

shaping at least one fiber-reinforced thermoplastic resin sheet continuously to form a hollow member with a first cross sectional shape, supplying a composite foamable sheet, which contains a fibrous sheet and a foamable resin composition formed of a thermoplastic resin and a foaming agent and permeated into the fibrous sheet, to an inside of the hollow member and integrally uniting the composite foamable sheet and the hollow member together, shaping the hollow member integrally united with the composite foamable sheet by applying to the hollow member with the composite foamable sheet at least one of a vacuum pressure and pressurized gas, and p1 heating the foamable resin composition at a temperature higher than a foaming temperature of said foaming agent to foam the foaming agent to thereby enlarge and thicken the hollow member to have a second cross sectional shape different from the first cross sectional shape.

18. A method according to claim 17, wherein an expansion ratio of the foamable resin composition for constituting a core layer is in a range of 1.5 to 5 times.

* * * * *